United States Patent
Suzuki et al.

(10) Patent No.: US 9,063,689 B2
(45) Date of Patent: Jun. 23, 2015

(54) COMMUNICATION APPARATUS COMPRISING INTEGRATED CIRCUIT TAG INTERFACE

(71) Applicants: Takanobu Suzuki, Nagoya (JP); Yoshitsugu Tomomatsu, Nagoya (JP); Hajime Okochi, Inazawa (JP)

(72) Inventors: Takanobu Suzuki, Nagoya (JP); Yoshitsugu Tomomatsu, Nagoya (JP); Hajime Okochi, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/191,623
(22) Filed: Feb. 27, 2014

(65) Prior Publication Data
US 2014/0240776 A1 Aug. 28, 2014

(30) Foreign Application Priority Data
Feb. 28, 2013 (JP) ................................ 2013-040088

(51) Int. Cl.
| | |
|---|---|
| G06F 3/12 | (2006.01) |
| G06F 21/35 | (2013.01) |
| H04L 29/06 | (2006.01) |
| H04W 76/02 | (2009.01) |
| H04N 1/00 | (2006.01) |
| H04W 88/02 | (2009.01) |

(52) U.S. Cl.
CPC .............. *G06F 3/1296* (2013.01); *G06F 21/35* (2013.01); *G06F 3/1291* (2013.01); *G06F 2221/2141* (2013.01); *H04N 1/00278* (2013.01); *H04N 1/00307* (2013.01); *H04N 1/00342* (2013.01); *H04L 63/0492* (2013.01); *H04W 76/025* (2013.01); *H04W 88/02* (2013.01)

(58) Field of Classification Search
None
See application file for complete search history.

(56) References Cited

U.S. PATENT DOCUMENTS

| | | |
|---|---|---|
| 8,116,679 B2 | 2/2012 | Dunko |
| 2004/0024884 A1 | 2/2004 | Rekimoto et al. |
| 2009/0034731 A1 * | 2/2009 | Oshima .......................... 380/270 |
| 2009/0036056 A1 * | 2/2009 | Oshima et al. ............... 455/41.3 |
| 2009/0103124 A1 | 4/2009 | Kimura et al. |

(Continued)

FOREIGN PATENT DOCUMENTS

| | | |
|---|---|---|
| JP | 2012-134932 A | 7/2012 |
| WO | 2010/030415 A1 | 3/2010 |

OTHER PUBLICATIONS

Sep. 25, 2014—(EP) Search Report—App 14157084.6.
Francesco Gallo: "NFC Tags: A technical introduction, applications and products", Dec. 1, 2011, pp. 1-21, XP055058511, Retrieved from the Internet: URL: http:// www.nfctags.com/documents/White_paper_$_{NFCTags}$_NXP_Technicalreport_December_2011.pdf [retrieved on Apr. 4, 2013].
"Connection Handover Tehnical Specification", NFC Forum, Jul. 7, 2010, pp. 1-23, XP055118241, Retrieved from the Internet: URL: http://www.cardsys.dk/download/NFC_Docs/NFC Connection Handover 1/2 Tehnical Specification.pdf [retrieved on May 15, 2014].
Texas Instruments Inc.: "Wifi Direct Overview", Feb. 2011, pp. 1-26, XP055123307, Retrieved from the Internet URL: http://iotedu.com/portal/sites/default/files/techfront/jorjin/pdf/wifi_direct_overview.pdf [retrieved on Jun. 13, 2014].

*Primary Examiner* — Miya J Cato
(74) *Attorney, Agent, or Firm* — Banner & Witcoff, Ltd.

(57) ABSTRACT

A first communication apparatus may comprise a first type of interface configured to function as an IC tag, a second type of interface, and a controller. The controller may cause the first type of interface to execute a sending operation. The sending operation may be executed by using a first wireless connection established between the first and second communication apparatuses. The sending operation may include an operation of the first type of interface to send network identification information to the second communication apparatus. The network identification information may be information to be used in a first wireless network to which both the first and second communication apparatuses belong. The controller may execute, after the first type of interface has executed the sending operation, a wireless communication of target data with the second communication apparatus via the second type of interface by using the first wireless network.

51 Claims, 8 Drawing Sheets

(56) References Cited

U.S. PATENT DOCUMENTS

| | | |
|---|---|---|
| 2010/0068997 A1 | 3/2010 | Dunko |
| 2010/0069008 A1 | 3/2010 | Oshima et al. |
| 2010/0188695 A1 | 7/2010 | Okigami |
| 2011/0117844 A1 | 5/2011 | Fujita |
| 2012/0099566 A1 | 4/2012 | Laine et al. |
| 2012/0278452 A1 | 11/2012 | Schmitz et al. |
| 2013/0137373 A1 | 5/2013 | Choi et al. |
| 2013/0229673 A1 | 9/2013 | Nakayama et al. |
| 2013/0231051 A1 | 9/2013 | Naruse |
| 2014/0004793 A1 | 1/2014 | Bandyopadhyay et al. |
| 2014/0092421 A1* | 4/2014 | Shibata ............ 358/1.14 |
| 2014/0153017 A1* | 6/2014 | Watanabe et al. ........... 358/1.13 |
| 2014/0280667 A1* | 9/2014 | Hildebrand et al. .......... 709/213 |

* cited by examiner (First Embodiment)

(Second Embodiment)

(Third Embodiment)

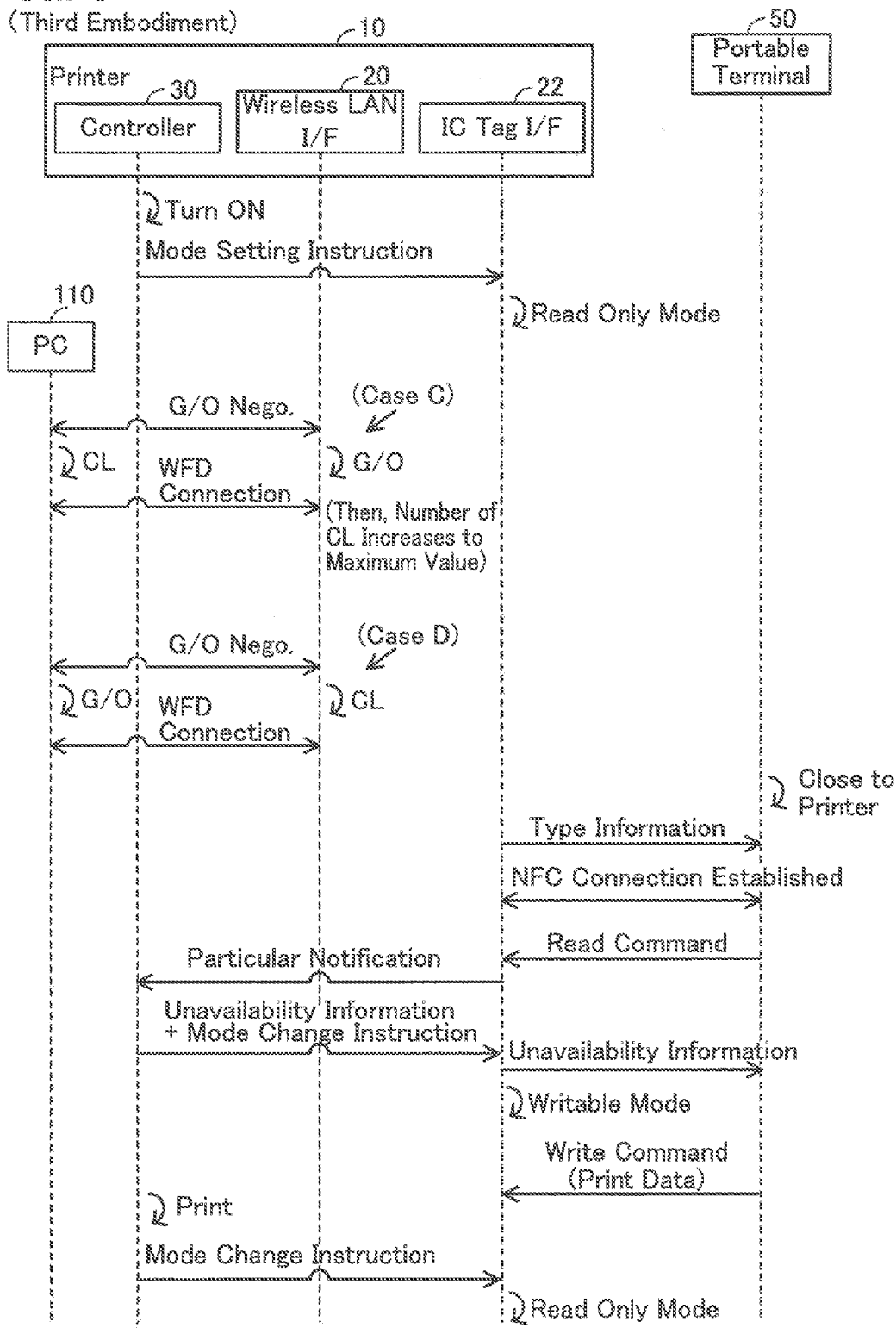

COMMUNICATION APPARATUS COMPRISING INTEGRATED CIRCUIT TAG INTERFACE

CROSS-REFERENCE TO RELATED APPLICATION

This application claims priority to Japanese Patent Application No. 2013-040088, filed on Feb. 28, 2013, the contents of which are hereby incorporated by reference into the present application.

TECHNICAL FIELD

In this specification, a communication apparatus that executes a wireless communication of target data is disclosed.

DESCRIPTION OF RELATED ART

A system is known that comprises a gate that is installed in a museum or the like, a portable communication terminal, an access point, and a contents server. The gate includes a reader-writer that performs a communication with a non-contact type IC chip in the portable communication terminal, and that sends the SSID of the access point and the URL of the contents server to the portable communication terminal. The portable communication terminal establishes communication with the access point and accesses the URL of the contents server. By doing this, the portable communication terminal is able to acquire contents data from the contents server via the access point.

SUMMARY

In this specification, a technique is disclosed according to which a first communication apparatus and a second communication apparatus may appropriately execute a wireless communication of target data.

In this specification, a first communication apparatus is disclosed. The first communication apparatus may comprise: a first type of interface configured to function as an IC (an abbreviation of Integrated Circuit) tag; a second type of interface; and a controller comprising: a processor; and a memory storing computer-readable instructions therein. The computer-readable instructions, when executed by the processor, may cause the first communication apparatus to perform: causing the first type of interface to execute a sending operation, the sending operation being executed by using a first wireless connection established between the first communication apparatus and a second communication apparatus, the sending operation including an operation of the first type of interface to send network identification information to the second communication apparatus, the network identification information being information to be used in a first wireless network to which both the first communication apparatus and the second communication apparatus belong; and executing, after the first type of interface has executed the sending operation, a wireless communication of target data with the second communication apparatus via the second type of interface by using the first wireless network to which the both the first communication apparatus and the second communication apparatus belong.

A control method and computer-readable instructions for implementation of the first communication apparatus and/or the second communication apparatus described above, and a non-transitory computer-readable recording medium in which the computer-readable instructions are stored, are also novel and useful. Moreover, a communication system comprising the first and second communication apparatuses described above is also novel and useful.

BRIEF DESCRIPTION OF DRAWINGS

FIG. 8 is a sequence diagram showing an operation of the printer and of a portable terminal of the third embodiment.

Figure 1:
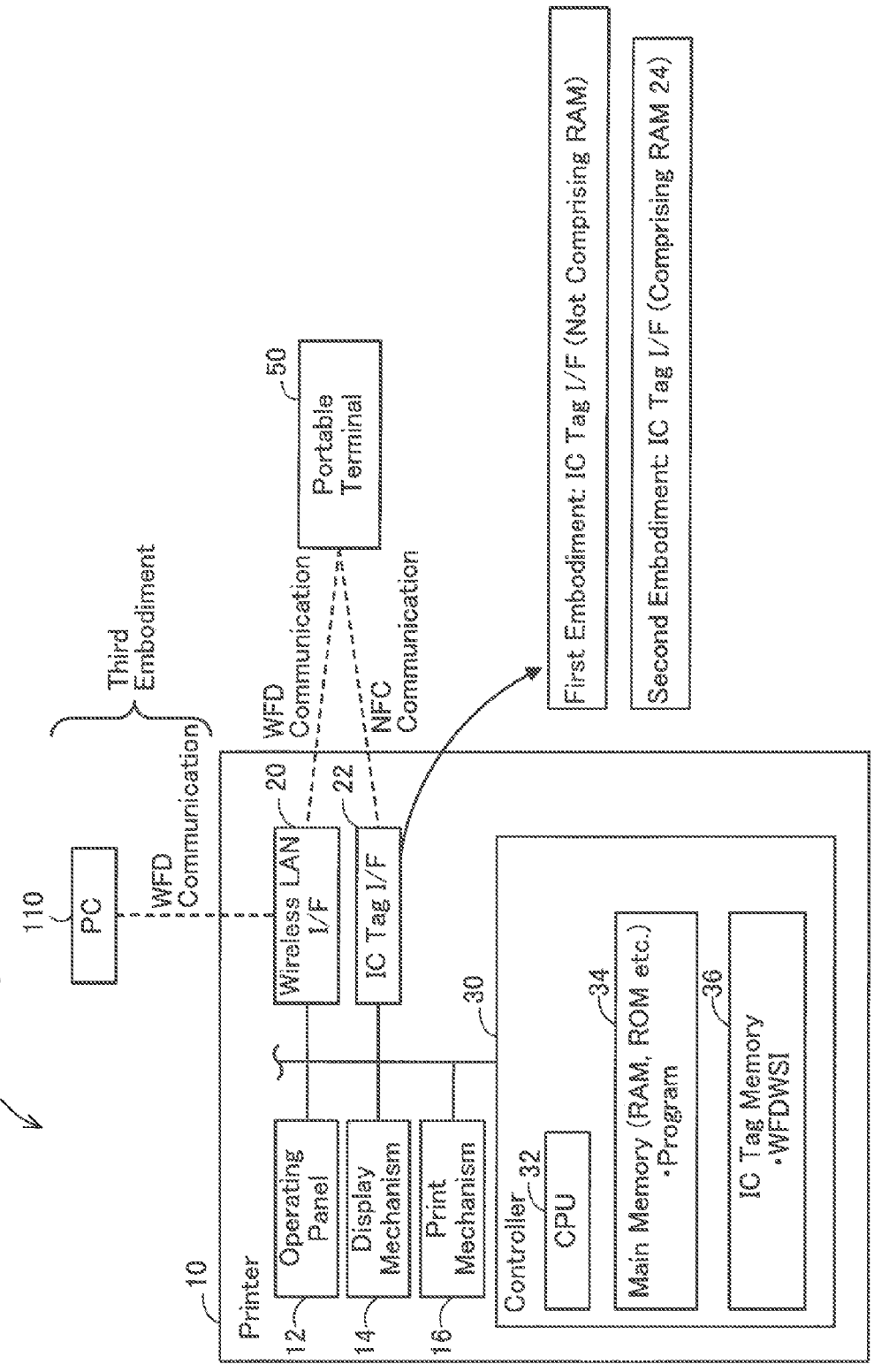
FIG. 1 shows a structure of a communication system.

EMBODIMENT (First Embodiment)
(Structure of a Communication System 2)
As shown in FIG. 1, a communication system 2 comprises a printer 10 and a portable terminal 50. While a PC (an abbreviation of "Personal Computer") 110 is shown in FIG. 1, this PC 110 is also employed in the third embodiment described below.

(Structure of the Printer 10)
The printer 10 is a peripheral apparatus (in other words, it is a peripheral apparatus of the PC 110 or the like) that is capable of performing a printing function. The printer 10 comprises an operating panel 12, a display mechanism 14, a print mechanism 16, a wireless LAN (an abbreviation of "Local Area Network") interface 20, an IC (an abbreviation of "Integrated Circuit") tag interface 22, and a controller 30. These various sections 12 through 30 are interconnected by bus lines (no reference symbol is shown for these). In the following, an interface will be referred to as an "I/F".

The operating panel 12 comprises a plurality of keys. The user is able to input various kinds of commands to the printer 10 by operating the operating panel 12. The display mechanism 14 is a display for displaying information of various kinds. The print mechanism 16 is a print mechanism of the ink jet type or the laser type or the like.

The wireless LAN I/F 20 is an I/F for performing a wireless communication according to the WFD (an abbreviation of "Wi-Fi Direct") standard (hereinafter, this will be termed "WFD communication"). The WFD standard is a wireless communication standard described in a standard document "Wi-Fi Peer-to-Peer (P2P) Technical Specification Version 1.1" issued by the Wi-Fi Alliance. The WFD standard is a wireless communication standard for performing a wireless communication according to, for example, the IEEE (an abbreviation of "The Institute of Electrical and Electronics Engineers, Inc.") 802.11 standard and standards conforming thereto (for example, 802.11a, 11b, 11g, 11n and so on).

In the following, an apparatus (for example, the printer 10) that is capable of performing the WFD communication according to the WFD standard will be termed a "WFD compatible apparatus". In the WFD standard document described above, three states are defined for a WFD compatible apparatus: a Group Owner state (hereinafter termed the "G/O state"), a client state (hereinafter termed the "CL state"), and a device state. Normally, the WFD compatible apparatus can selectively operate in any one of the three states described above.

When a pair of WFD compatible apparatuses in the device state are to form a new wireless network, normally this pair of WFD compatible apparatuses perform a wireless communication for so-called G/O negotiation. In the G/O negotiation, one of this pair of WFD compatible apparatuses decides to go into the G/O state (in other words, to become a G/O apparatus), while the other one decides to go into the CL state (in other words, to become a CL apparatus). Thereafter this pair of WFD) compatible apparatuses establishes a mutual connection and forms a wireless network (in other words, a WFD network). It should be understood that, in FIG. 3 etc. that will be described hereinafter, the WFD network is denoted by "WFD NW".

In this stage of newly forming the WFD network by G/O negotiation, only one G/O apparatus and one CL apparatus belong to the WFD network. However, the G/O apparatus is capable of establishing a connection with another apparatus, and of newly adding that other apparatus to the WFD network as another CL apparatus. In this case, a state will be established in which two or more CL apparatuses belong to the WFD network. In other words, one G/O apparatus and one or more CL apparatuses may be present upon the WFD network.

The G/O apparatus manages one or more CL apparatuses. To speak in concrete terms, the G/O apparatus registers the MAC addresses of one or more CL apparatuses in a management list in a memory of the G/O apparatus. Moreover, when a CL apparatus leaves the WFD network, the G/O apparatus deletes the MAC address of that CL apparatus from the management list. It should be understood that the maximum value for the number of CL apparatuses that can be managed by the G/O apparatus (in other words, the maximum value for the number of MAC addresses of CL apparatuses that can be registered in the management list) is determined in advance by the G/O apparatus. To speak generally, the maximum value described above may be an integer which is one or more.

The G/O apparatus is capable of performing a wireless communication of target data with the CL apparatus registered in the management list, not via any other apparatus. The target data is data that includes information on the network layer of the OSI reference model, and information on a higher ranking layer than the network layer (for example on the application layer), and may for example include print data, scan data, or the like. Moreover, the G/O apparatus is capable of relaying a wireless communication of target data between a plurality of CL apparatuses. That is, a pair of CL apparatuses can perform the wireless communication of target data via the G/O apparatus.

As described above, with the WFD network, between a WFD compatible apparatus that is a source for sending of target data and a WFD compatible apparatus that is a destination for sending of target data, these WFD compatible apparatuses are capable of performing the wireless communication of the target data, not via any access point that is built differently from these WFD compatible apparatuses. In other words, the WFD communication, the WFD standard may respectively be termed a wireless communication not via an access point, a wireless communication standard in which no access point is employed.

While the G/O apparatus is not capable of performing a wireless communication of target data with a WFD compatible apparatus that is in the device state (in other words, with a device apparatus), it is capable of performing a wireless communication of connection data of the WFD) standard with a device apparatus. In other words, the G/O apparatus is capable of establishing a connection with the device apparatus by performing the wireless communication of connection data of the WD standard with the device apparatus, so as to cause the device apparatus to participate to the WFD network. That is, the device apparatus is capable of establishing the connection with the G/O apparatus by performing the wireless communication of connection data of the WFD standard with the G/O apparatus, so as to participate to the WFD network. In this case, the device apparatus transitions from the device state to the CL state. The connection data of the WFD standard is data that includes information for layers of the OSI reference model having lower ranking than the network layer (for example, the physical layer and the data link layer) (in other words, data that does not include information for the network layer), and may include, for example, a Probe Request signal, a Probe Response signal, a Provision Discovery Request signal, a Provision Discovery Response signal, an Association Request signal, an Association Response signal, an Authentication Request signal, an Authentication Response signal, a 4-Way Handshake signal, and so on.

It should be understood that the G/O apparatus can also establish a connection with apparatus that is not capable of performing the WFD communication according to the WFD standard (hereinafter termed "legacy apparatus"), and can also cause the legacy apparatus to participate to the WFD network. When the connection with the legacy apparatus is established, the G/O apparatus registers the MAC address of the legacy apparatus in the management list. Due to this, the legacy apparatus is capable of participating to the WFD network. Although such legacy apparatus is not capable of selectively operating in any of the three states described above (i.e. the G/O state, the CL state, and the device state), while it is belonging to the WFD network, it operates in a similar state to that of the CL apparatus.

While the printer 10 is the WFD compatible apparatus, in this embodiment, it cannot operate in the CL state. Moreover, the printer 10 is not provided with any program for performing the G/O negotiation with another WFD compatible apparatus. In other words, the printer 10 is capable of selectively operating in either of two states: the G/O state and the device state.

The IC tag I/F 22 is an I/F for performing a wireless communication according to the so-called NFC (an abbreviation of "Near Field Communication") standard for a wireless communication over short distances (hereinafter termed "NFC communication"). The NFC standard is a wireless communication standard based upon, for example, the international standards ISO/IEC 21481 or 18092. A so-called NFC forum device I/F and a so-called NFC forum tag I/F are per se known as types of IF for performing NFC communication. The IC tag IF 22 is the NFC forum tag, and functions as an IC tag according to the NFC standard (in other words, according to ISO/IEC 21481 or 18092).

The NFC forum device is an I/F that is capable of selectively operating in any of a P2P (an abbreviation of "Peer To Peer") mode, an R/W (an abbreviation of "Reader/Writer") mode, and a CE (an abbreviation of "Card Emulation") mode. For example, if both an NFC I/F of a first apparatus and an NFC I/F of a second apparatus are operating in the P2P mode, then the first and second apparatuses are capable of performing a bidirectional communication of information. Moreover if, for example, the NFC I/F of the first apparatus is operating in the Reader mode of the R/F mode while the NFC I/F of the second apparatus is operating in the CE mode, then the first apparatus is capable of reading out information from the second apparatus, in other words is capable of receiving the information from the second apparatus. Furthermore if, for example, the NFC I/F of the first apparatus is operating in the Writer mode of the R/W mode while the NFC I/F of the second apparatus is operating in the CE mode, then the first apparatus is capable of writing the information to the second apparatus, in other words is capable of sending the information to the second apparatus.

The NFC forum tag (in other words the IC tag I/F 22) is not an I/F that is capable of selectively operating in any one of the three modes described above, but rather is an I/F that only functions as an IC tag. For example, when an NFC I/F of the portable terminal 50 is operating in the Reader mode of the R/W mode, then the portable terminal 50 is capable of reading out information from the IC tag I/F 22 of the printer 10, in other words is capable of receiving the information from the printer 10. Moreover, for example, when the NFC I/F of the portable terminal 50 is operating in the Writer mode of the R/W mode, then the portable terminal 50 is capable of writing information to the IC tag I/F 22 of the printer 10, in other words is capable of sending the information to the printer 10.

Since the NFC forum tag (in other words the IC tag I/F 22) is not an I/F that is capable of selectively operating in any one of the three modes described above, accordingly it has a simpler structure than that of the NFC forum device (in other words, its IC chip structure is simpler). Speaking generally, an IC chip that functions as the NFC forum tag is cheaper than an IC chip that functions as the NFC forum device.

It should be understood that the method for supplying an electrical power to the IC tag I/F 22 may be either a so-called passive type or a so-called active type. The passive type is built so that the electrical power is generated by receiving radio waves from the NFC I/F of the portable terminal 50, and this starts the circuitry of the IC chip within the IC tag IT 22. Since an IC tag IF of the passive type has a simpler construction as compared to an IC tag I/F of the active type, accordingly it is comparatively cheap in price, and moreover it is possible to implement the I/F itself in a more compact manner. However, as compared to an IC tag I/F of the active type, an IC tag I/F of the passive type has the characteristic that it is only capable of operating over a shorter communication distance. On the other hand, the active type is built to receive supply of the electrical power from a power supply within the IC tag I/F or from a power supply within the printer 10, and this starts the circuitry of the IC chip within the IC tag I/F 22. Thus, as compared to an IC tag I/F of the passive type, an IC tag I/F of the active type has the characteristics that it is higher in price, and that it is capable of operating over a longer communication distance.

In this embodiment, in order to send information supplied from the controller 30 to an external apparatus (for example, to the portable terminal 50), the IC tag I/F 22 comprises a buffer memory (not show in the drawings) for temporarily storing that information. However, the IC tag I/F 22 does not include any RAM for long term storage of information supplied from the controller 30 (for example, during the interval until other information is supplied from the controller 30). It should be understood that, in the second embodiment to be described hereinafter, the IC tag I/F 22 does include a RAM 24 (refer to FIG. 5).

There are two operating modes for the IC tag I/F 22: a Read Only mode and a Writable mode. The Read Only mode is a mode in which, if the IC tag I/F 22 receives a read command according to the NFC standard from an external apparatus (for example the portable terminal 50), then an operation for sending information to the external apparatus is performed in response to this read command (hereinafter this will be termed "read response operation"). However, the Read Only mode is a mode in which, even if the IC tag I/F 22 receives a write command according to the NFC standard from an external apparatus, no operation is performed in response to this write command (hereinafter this will be termed "write response operation"). On the other hand, the Writable mode is a mode in which both read response operation and write response operation are performed.

The write operation described above is an operation of, if for example information is received from the external apparatus along with the rite command, supplying the information to the controller 30. Since no write response operation is performed in the Read Only mode, the information received from the external apparatus is not supplied to the controller 30, so that, as a result, it is possible to avoid information within the IC tag memory 36 of the controller 30 being overwritten by the received information. Moreover, in the second embodiment to be described hereinafter, it is also possible to avoid information within the RAM 24 of the IC tag I/F 22 being overwritten by the received information.

The differences between the wireless LAN I/F 20 and the I/C tag I/F 22 will be explained. The communication speed of wireless communication via the wireless LAN I/F 20 (for example, the maximum for this communication speed may be 11 to 600 Mbps) is faster than the communication speed of wireless communication via the IC tag I/F 22 (for example, the maximum for this communication speed may be 100 to 424 Mbps). Moreover, the frequency of the carrier wave for wireless communication via the wireless LAN I/F 20 (for example, the 2.4 GHz band or the 5.0 GHz band) is different from the frequency of the carrier wave for wireless communication via the IC tag I/F 22 (for example, the 13.56 GHz band). Moreover, the controller 30 is capable of performing the NFC communication with the portable terminal 50 via the IC tag I/F 22 if the distance between the printer 10 and the portable terminal 50 is less than or equal to around 10 cm, for example. On the other hand, the controller 30 is capable of performing the NFC communication with the portable terminal 50 via the wireless LAN I/F 20, whether the distance between the printer 10 and the portable terminal 50 is less than or equal to around 10 cm, or whether it is greater than or equal to 10 cm (for example, the maximum distance may be about 100 m). In other words, the maximum distance over which the printer 10 is capable of performing the wireless communication with an apparatus that is a destination for communication (for example the portable terminal 50) via the wireless LAN I/F 20 is greater than the maximum distance over which the printer 10 is capable of performing the wireless communication with an apparatus that is a destination for communication via the IC tag I/F 22.

The controller 30 comprises a CPU 32, a main memory 34, and an IC tag memory 36. The CPU 32 performs processing of various types, according to a program that is stored in the main memory 34. The main memory 34 comprises a RAM, a ROM, etc. The main memory 34 not only stores the program described above, but also stores data of various kinds created or acquired by the printer 10 while various types of processing are being performed. The IC tag memory 36 is a memory for storing data to be supplied to the IC tag I/F 22.

(Structure of the Portable Terminal 50)

The portable terminal 50 is a portable terminal device such as a portable telephone (for example, a smartphone), a PDA, a notebook PC, a tablet PC, a portable type music reproduction device, a portable type video reproduction device, or the like. The portable terminal 50 comprises a wireless LAN I/F and a NFC I/F, not shown in the drawings.

The portable terminal 50 is the WFD compatible apparatus, and can selectively operate in any one of three states: the G/O state, the CL state, and the device state. Accordingly, the portable terminal 50 is capable of performing the WFD communication via the wireless LAN I/F of the portable terminal 50.

It should be understood that in a variant embodiment, the portable terminal 50 might not be the WFD compatible apparatus, but rather might be the legacy apparatus. With this structure as well, the portable terminal 50 would be able to establish a connection with a G/O apparatus (for example, with the printer 10), and would be able to participate to a WFD network.

Moreover, the portable terminal 50 can also perform the NFC communication via the NFC I/F of the portable terminal 50. It should be understood that the NFC I/F of the portable terminal 50 is the NFC forum device as described above, and is capable of operating in, at least, the R/W mode.

Figure 2:
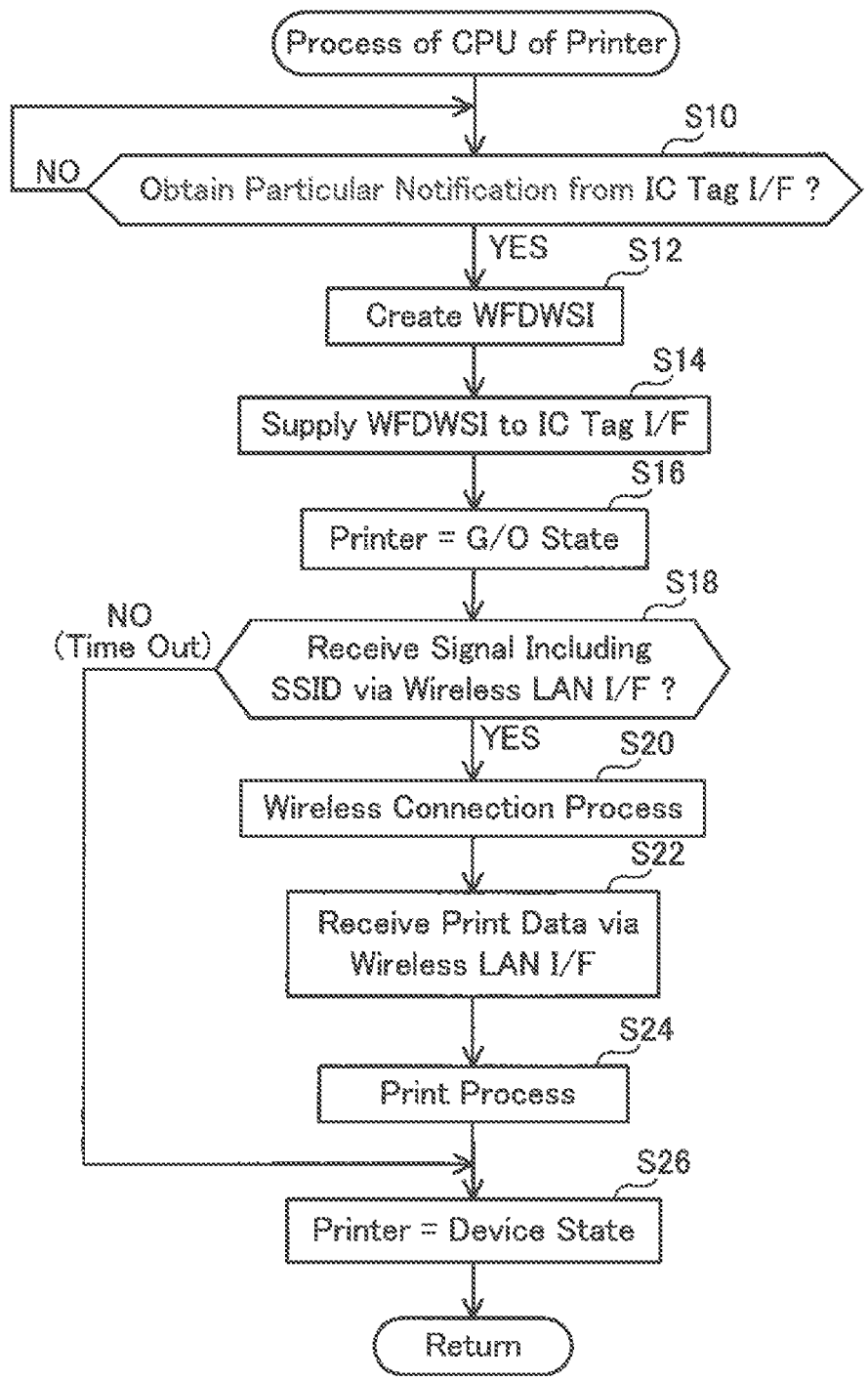
FIG. 2 shows a flow chart for processing performed by a CPU of a printer of a first embodiment.
Figure 3:
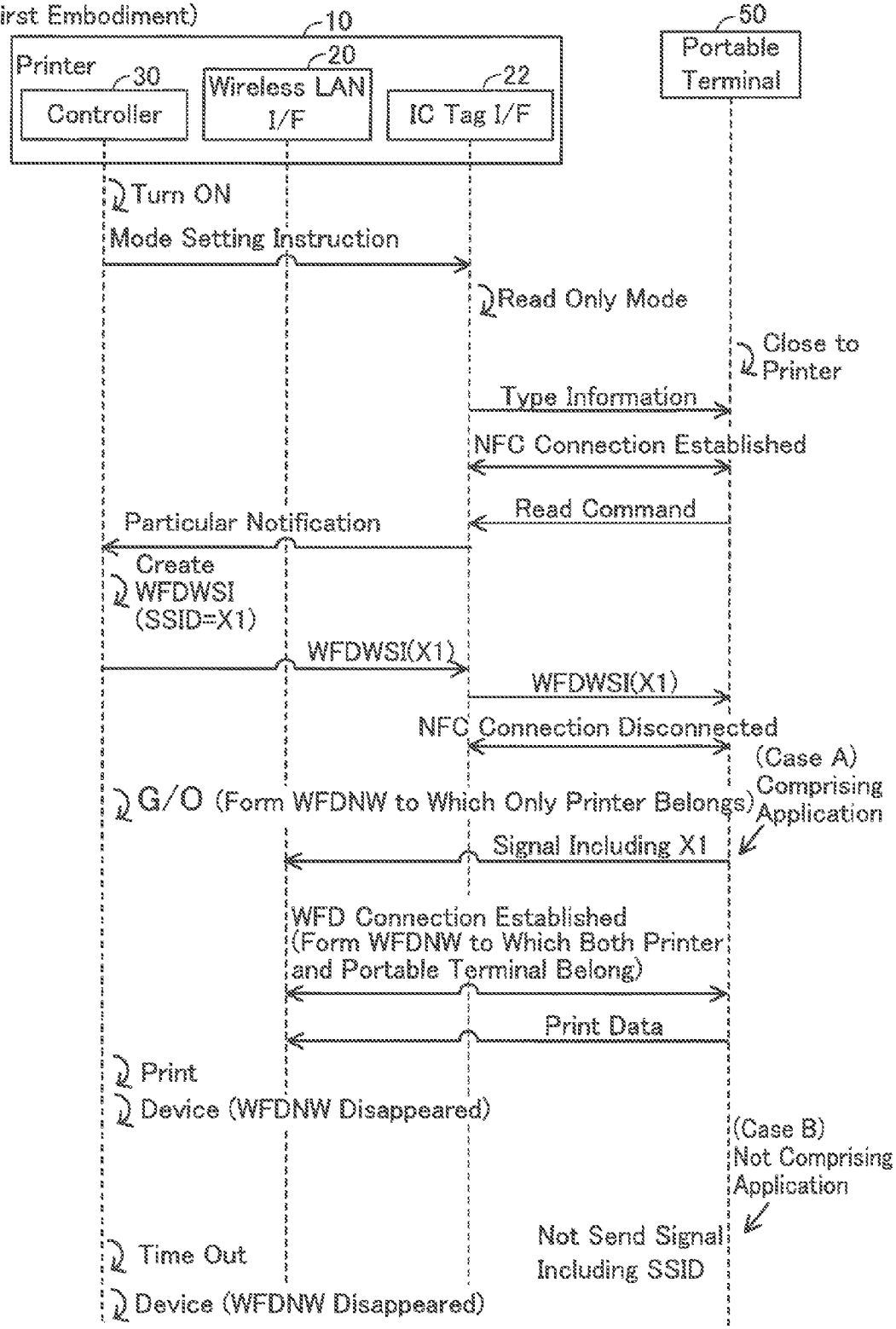
FIG. 3 is a sequence diagram showing an operation of the printer and of a portable terminal of the first embodiment.

(The Processing Performed by the CPU 32 of the Printer 10: FIGS. 2 and 3)

Next, the processing performed by the CPU 32 of the printer 10 of this embodiment will be explained with reference to FIGS. 2 and 3. FIG. 2 shows a flow chart of the processing performed by the CPU 32, while FIG. 3 shows a concrete example that is implemented by the flow chart of FIG. 2.

When the power to the printer 10 is turned on (in other words, when the printer 10 is activated), the printer 10 is not connected to any wireless network, and is in the device state of the WFD standard. When the power to the printer 10 is turned on, the CPU 32 stores a value indicating the device state in the main memory 34 as a value that specifies the state of the printer 10 (in the following, this will be termed the "WFD state value").

As shown in FIG. 3, when the power to the printer 10 is turned on, the CPU 32 of the printer 10 (in other words, the controller 30) supplies a mode setting instruction to the IC tag I/F 22, and sets the operation mode of the IC tag I/F 22 to the Read Only mode. Due to this, it is possible to prevent information within the IC tag memory 36 of the controller 30 from being overwritten by information that is received from an external apparatus (for example, from the portable terminal 50). As a result, as will be described hereinafter in detail, the printer 10 is able to supply the information within the IC tag memory 36 (i.e. the WFD WSI, as will be described hereinafter) to the portable terminal 50 in an appropriate manner.

The IC tag I/F 22 sends a detection radio signal for detecting an apparatus with which the NFC communication can be performed (for example, the portable terminal 50). The NFC I/F of the portable terminal 50 also sends a detection radio signal for detecting an apparatus with which the NFC communication can be performed (for example, the printer 10). When the user brings the NFC I/F of the portable terminal 50 near to the IC tag I/F 22 of the printer 10, then the distance between the NFC I/F of the portable terminal 50 and the IC tag I/F 22 of the printer 10 becomes shorter than the distance (for example 10 cm) over which these radio signals can be received. In this case, one of the IC tag I/F 22 of the printer 10 and the NFC I/F of the portable terminal 50 receives the detection radio signal from the other, and sends a response radio signal.

Next, the wireless communication is performed in order to establish an NFC connection (in other words, a wireless connection according to the NFC standard) between the IC tag I/F 22 of the printer 10 and the NFC I/F of the portable terminal 50. In this process of the wireless communication, the IC tag I/F 22 of the printer 10 sends type information specifying that the IC tag I/F 22 is itself functioning as the NFC standard IC tag (in other words, that it is an I/F of the NFC forum tag) to the NFC I/F of the portable terminal 50. As a result, the portable terminal 50 is able to know that its opposite party in communication (in other words the printer 10) is the NFC forum tag.

When the NFC connection has been established between the IC tag I/F 22 of the printer 10 and the NFC I/F of the portable terminal 50, then the portable terminal 50 determines, as a mode in which the portable terminal 50 is to operate, one mode among the R/W mode. This determination is based on a program (for example an application) that is loaded in the portable terminal 50. For example, if a printing application for causing the printer 10 to perform the printing function has been installed upon the portable terminal 50, then the portable terminal 50 determines that the portable terminal 50 is to operate in the Reader mode of the R/W mode, according to the printing application. On the other hand, if the printing application has not been installed upon the portable terminal 50, then the portable terminal 50 may determine that the portable terminal 50 is to operate in the Reader mode of the R/W mode, or may determine that the portable terminal 50 is to operate in the Writer mode of the R/W mode, according to some application other than the printing application, or according to the operating system of the portable terminal 50 (in other words, according to its OS).

If the portable terminal 50 determines that the portable terminal 50 is to operate in the Reader mode of the R/W mode, then it sends a read command to the IC tag I/F 22 of the printer 10. Moreover, if the portable terminal 50 determines that the portable terminal 50 is to operate in the Writer mode of the R/W mode, then it sends a write command to the IC tag I/F 22 of the printer 10.

The IC tag I/F 22 of the printer 10 does not perform the write response operation even if it receives the write command from the portable terminal 50. This is because the operation mode of the IC tag I/F 22 is set to the Read Only mode. On the other hand, if the IC tag I/F 2 of the printer 10 receives the read command from the portable terminal 50, then it performs the read response operation. That is, first, the IC tag I/F 22 supplies to the controller 30 a particular notification for notifying the controller 30 that the NFC connection has been established between the printer 10 and the portable terminal 50.

As shown in S10 of FIG. 2, the CPU 32 monitors that the particular notification is obtained from the IC tag I/F 22. When the particular notification is obtained from the IC tag I/F 22 (YES in S10), the CPU 32 transfers to S12.

In S12, the CPU 32 creates wireless setting information to be used by a WFD network to which both the printer 10 and the portable terminal 50 are to belong. It should be understood that the wireless setting information used by the WFD network will be termed the "WFD WSI". The WFD WSI includes an SSID (an abbreviation of "Service Set Identifier"), a BSSID (an abbreviation of "Basic Service Set Identifier"), an authentication method, an encryption method, and a password. The SSID) and the BSSID are identification information for identifying the WFD network. More specifically, the SSID is a network identifier of the WFD network, and the BSSID is a MAC address of the printer 10. The authentication method, the encryption method, and the password are information for performing authentication of apparatus, encryption of data, and so on upon the WFD network. In FIG. 3, "X1" is shown as being the concrete value of the SSID.

The CPU 32 newly creates the SSID and the password by generating random character strings. However, the BSSID, the authentication method, and the encryption method are predetermined information, and are not information newly created by the CPU 32. The CPU writes the created WFD WSI into the IC tag memory 36.

Next, in S14, the CPU 32 supplies the WFD WSI in the IC tag memory 36 to the IC tag IF 22. As a result, the IC tag I/F 22 sends the WFD WSI to the portable terminal 50 by using the NFC connection (in other words, the NFC connection that was used in communication of the read command). The NFC connection is disconnected when the WFD WSI has been sent from the IC tag I/F 22.

Since as described above the IC tag I/F 22 is set to the Read Only mode, even if it is supposed that the write command from the portable terminal 50 is received after the WFD WSI has been stored in the IC tag memory 36 (for example, even if the write command is received that is sent by some application running on the portable terminal 50 other than the printing application), it is possible to prevent the WFD WSI in the IC tag memory 36 from being overwritten by other information. Due to this, the printer 10 is able to send the WFD WSI to the portable terminal 50 in an appropriate manner.

Next, in S16, the CPU 32 changes the state of the printer 10 from the device state to the G/O state. In this step S16, the CPU 32 spontaneously transitions the state of the printer 10 to the G/O state, without performing the G/O negotiation. That is, first, the CPU 32 changes the WFD state value in the main memory 34 from a value that indicates the device state to a value that indicates the G/O state. Next, the CPU 32 creates, in the main memory 34, a management list in which MAC addresses of CL apparatuses are to be written. At the stage of this step S16, no MAC addresses are written in this management list. In other words, at the stage of this step S16, only the printer 10, which is the G/O apparatus, belongs to the WFD network.

As shown in the case A of FIG. 3, if the printing application has been installed on the portable terminal 50, and the portable terminal 50 receives the WFD WSI from the printer 10, the portable terminal 50 performs processing using this WFD WSI for establishing a wireless connection according to the WFD standard (hereinafter termed a "WFD connection") with the printer 10. That is, the portable terminal 50 sends, via the wireless LAN I/F of the portable terminal 50, a Probe Request signal including the SSID included in the WFD WSI. On the other hand, as shown in the case B of FIG. 3, if the printing application is not installed on the portable terminal 50, and the portable terminal 50 operates in the Reader mode and is able to receive the WFD WSI from the printer 10, it does not send the Probe Request signal. This is because there is no printing application installed for interpreting the WFD WSI and for sending the Probe Request signal.

In S18 of FIG. 2, the CPU 32 monitors that the Probe Request signal including the SSID "X1" is received via the wireless LAN I/F 20. If the CPU 32 receives the Probe Request signal including the SSID "X1" (in other words, in the case A of FIG. 3), then it determines YES in S18, and transfers to S20. On the other hand, if a predetermined time interval elapses from when the printer 10 transitions to the G/O state in S16, while the Probe Request signal including the SSID "X1" is not received (in other words, in the case B of FIG. 3), then the CPU 32 determines NO in S18 and skips the steps S20 through S24 (in other words, reception processing and print processing for print data are not performed) and transfers to S26.

In S20, the CPU 32 performs processing for establishing the WFD connection with the portable terminal 50 (in other words, processing for causing the portable terminal 50 to participate to the WFD network in which the printer 10 is the G/O apparatus). That is, the CPU 32 performs, via the wireless LAN I/F 20, a communication of connection data with the portable terminal 50, such as a Probe Response signal, an Authentication Request signal, an Authentication Response signal, and so on.

In the process described above of the communication of the connection data, the portable terminal 50 sends the authentication method, the encryption method, the password and so on included in the WFD WSI to the printer 10. The CPU 32 of the printer 10 performs authentication of the portable terminal 50. Normally this authentication succeeds, since the WFD WSI is data that was sent from the printer 10 to the portable terminal 50. As a result, the WFD connection is established between the wireless LAN I/F 20 of the printer 10 and the wireless LAN I/F of the portable terminal 50.

When the WFD connection is established, the CPU 32 writes the MAC address of the portable terminal 50 in the management list. Due to this, the portable terminal 50 participates as a CL apparatus in the WFD network in which the printer 10 is the G/O apparatus. In other words, the CPU 32 forms the WFD network to which both the printer 10 and the portable terminal 50 belong.

When the WFD connection is established, the portable terminal 50 (in other words, the printing application) sends print data to the printer 10 via the wireless LAN I/F of the portable terminal 50, using the WFD network. Since the portable terminal 50 is the CL apparatus while the printer 10 is the G/O apparatus, the print data is directly sent from the portable terminal 50 to the printer 10, not via any other apparatus. The print data is data that is designated by the user as being the subject for printing, for example an image file, a document file, or the like.

In S22, the CPU 32 receives the print data from the portable terminal 50 via the wireless LAN I/F 20, by using the WFD network. Next, in S24, the CPU 32 supplies the print data to the print mechanism 16. Due to this, the print mechanism 16 prints an image represented by the print data upon a printing medium.

Since the print data is an image file or the like, it has a comparatively large data size. As described above, the communication speed of the NFC communication is slower than the communication speed of the WFD communication. Accordingly, supposing that a structure for performing the wireless communication of the print data between the printer 10 and the portable terminal 50 using the NFC communication were to be employed, then a rather long period of time would be required for communicating the print data. By contrast, in this embodiment, since the printer 10 and the portable terminal 50 perform the wireless communication of the print data by using the WFD communication, it is possible to perform the wireless communication of the print data rapidly.

In S26, the CPU 32 changes the state of the printer 10 from the G/O state to the device state. In other words, the CPU 32 changes the WFD state value in the main memory 34 from its value that indicates the G/O state to a value that indicates the device state. Next, the CPU 32 deletes the management list from the main memory 34. Due to this, the WFD network disappears. When S26 has been completed, the CPU 32 returns to S10.

(Advantageous Effects of the First Embodiment)

According to the printer 10 of this embodiment, the IC tag I/F 22 that functions as an IC tag according to the NFC standard uses the NFC connection (in other words, performs NFC communication) for sending the WFD WSI including the SSID "X1" to the portable terminal 50. The printer 10 transitions to the G/O state, and forms the WFD network to which only the printer 10 belongs. When the printer 10 receives the Probe Request signal including the SSID "X1"

from the portable terminal 50, it establishes the WFD connection between the printer 10 and the portable terminal 50, and forms the WFD network to which both the printer 10 and the portable terminal 50 belong. Next, the printer 10 receives the print data from the portable terminal 50 by using the WFD network (in other words, by performing the WFD communication). Then the printer 10 prints the image represented by the print data upon the printing medium. Due to this, it is possible to supply a printed medium to the user of the portable terminal 50.

As described above, as compared to the NFC forum device, the NFC forum tag (in other words the IC tag I/F 22) has a simpler structure (in other words, the structure of such an IC chip is simpler). Accordingly, when this is compared with the case of employing the NFC forum device as an I/F for performing the NFC communication, it is possible to implement the printer 10 of this embodiment with a simpler structure. As a result, for example, it is possible to manufacture the printer 10 at a comparatively cheap price.

It should be understood that, if the IC tag I/F 22 were to include a RAM as in the second embodiment to be described hereinafter, then, in S14 of FIG. 2, the CPU 32 would be required to write the WFD WSI into the RAM within the IC tag I/F 22. By contrast, since in this embodiment the IC tag I/F 22 does not include the RAM, the CPU 32 does not need to write the WFD WSI into the RAM within the IC tag I/F 22 in S14 of FIG. 2. Thus it is possible to perform the processing of S14 rapidly, and as a result it is possible to perform the supply of the WFD WSI rapidly from the printer 10 to the portable terminal 50.

(Correspondence Relationship)

The printer 10 and the portable terminal 50 are respectively examples of the "first communication apparatus" and of the "second communication apparatus". The IC tag I/F 22 and the wireless LAN I/F 20 are respectively examples of "first type of interface" and "second type of interface". The operation of sending the WFD WSI including the SSID "X1" to the portable terminal 50 is an example of "sending operation". The print data is an example of "target data". The WFD standard is an example of "specific standard". The Read Only mode is an example of "first mode". The NFC connection and the WFD connection are respectively examples of "first wireless connection" and "second wireless connection". The G/O state and the device state are respectively examples of "parent state" and "non-belonging state". The WFD network, the SSID "X1", and the Probe Request signal are respectively examples of "first wireless network", "network identification information", and "specific signal". The printing application is an example of "application".

(Second Embodiment)

The features of difference of this second embodiment from the first embodiment will now be explained. In this embodiment, the I/C tag I/F 22 includes a RAM 24 for storing, over the long term, information supplied from the controller 30.

Figure 4:
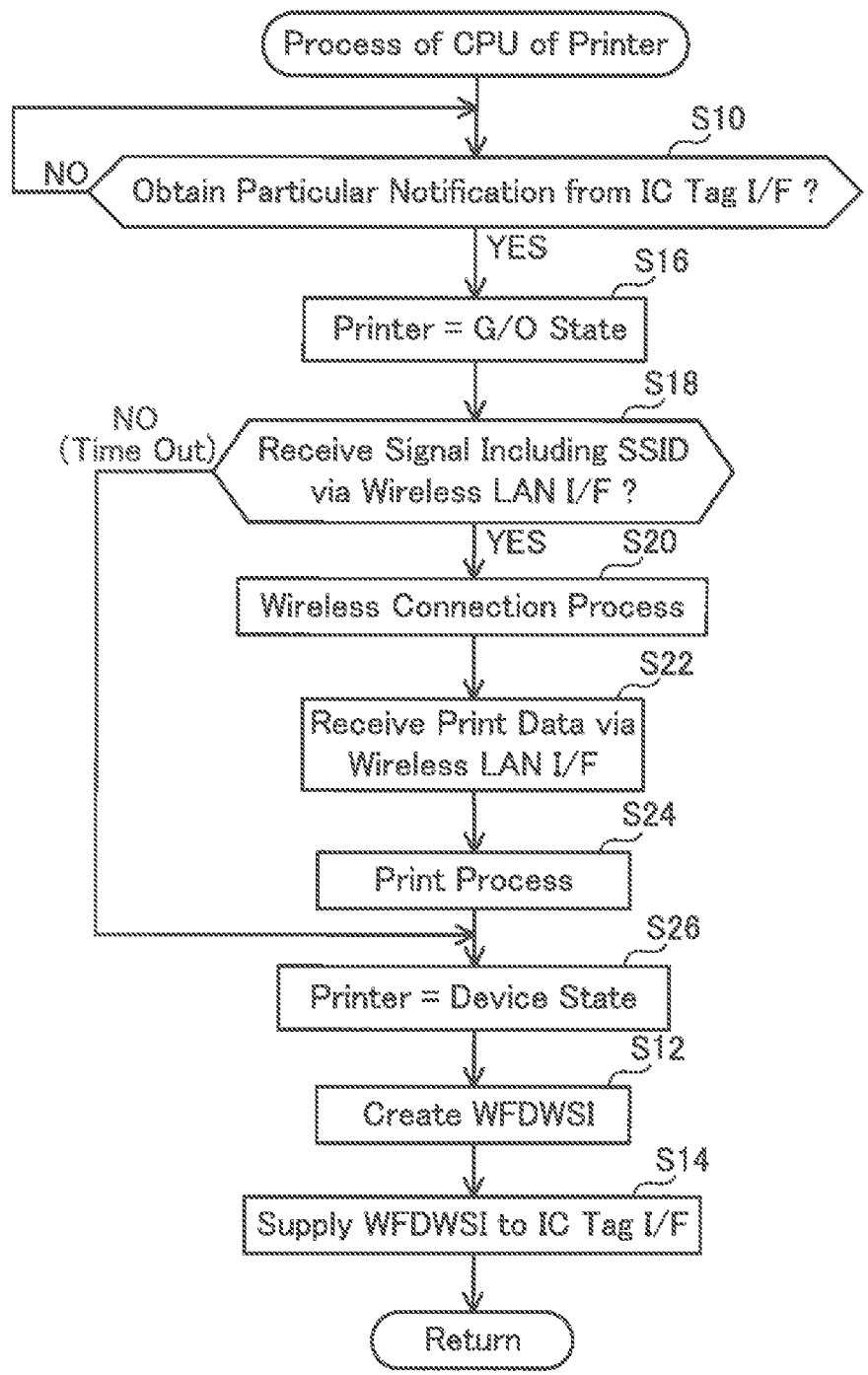
FIG. 4 shows a flow chart for processing performed by a CPU of a printer of a second embodiment.
Figure 5:
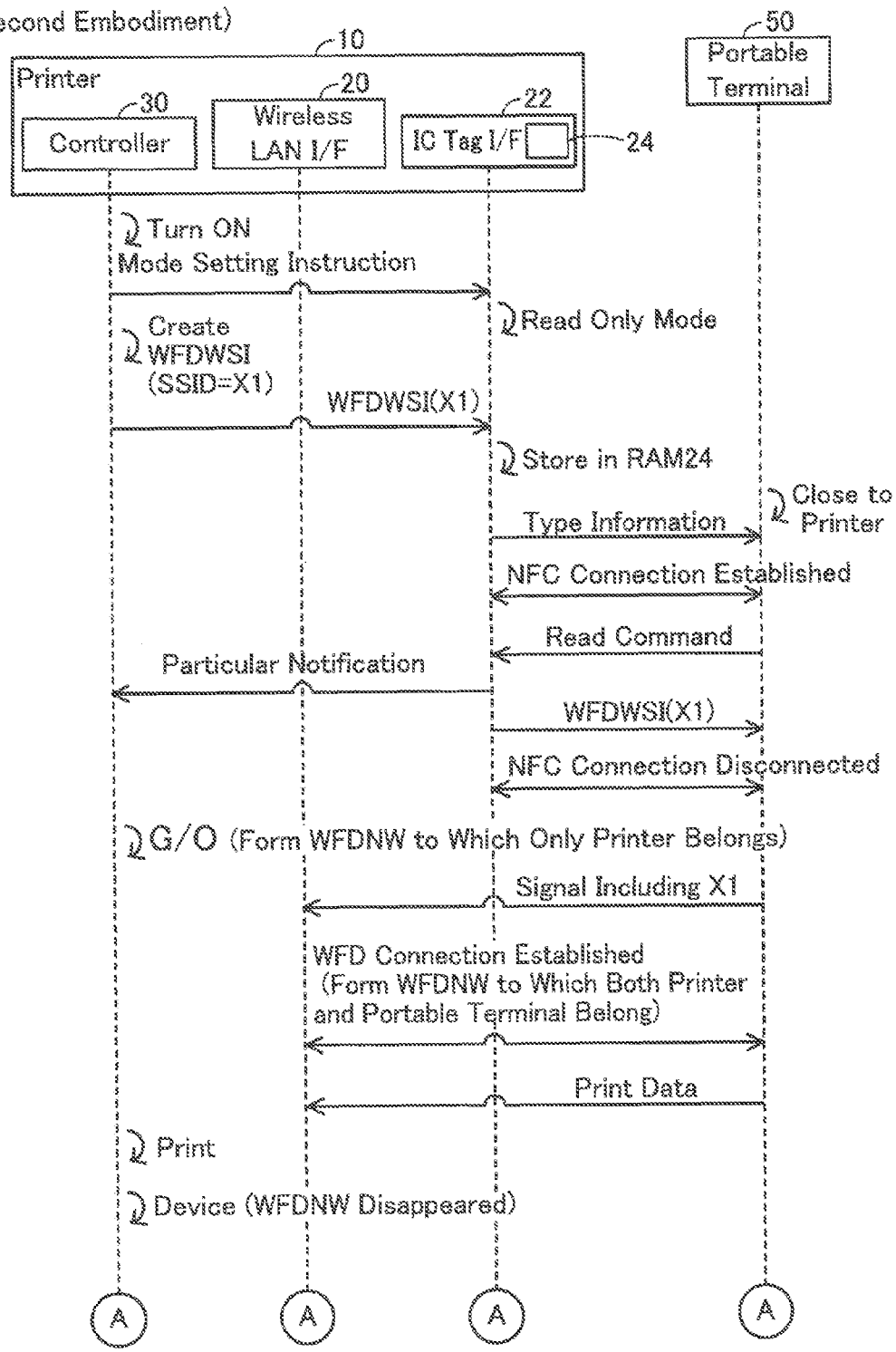
FIG. 5 is a sequence diagram showing an operation of the printer and of a portable terminal of the second embodiment.
Figure 6:
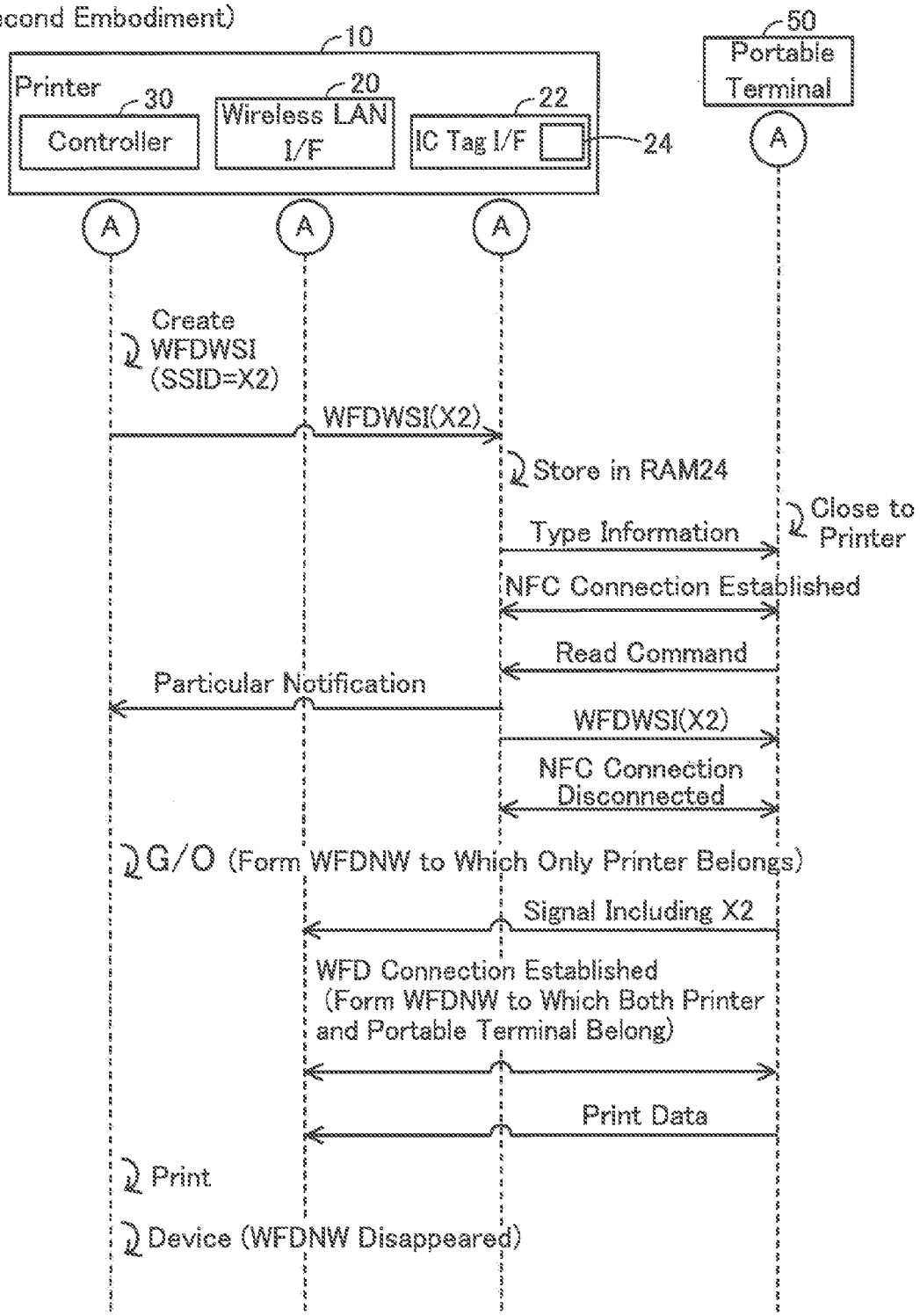
FIG. 6 is a sequence diagram continuing from FIG. 5.

(The Processing Performed by the CPU 32 of the Printer 10: FIGS. 4 Through 6)

The details of the processing performed by the CPU 32 of the printer 10 of this embodiment will now be explained with reference to FIGS. 4 through 6. The difference from the first embodiment is that, when the power to the printer 10 is turned on, the CPU 32 of the printer 10 (in other words, the controller 30) creates the WFD WSI, and supplies the created WFD WSI to the IC tag I/F 22. The method for creating the WFD WSI is the same as that in S12 of FIG. 2. In FIG. 5, "X1" is shown as being the concrete value of the SSID included in the created WFD WSI. The IC tag I/F 22 stores the WFD WSI in the RAM 24.

The processing of S10 through S26 of FIG. 4 is the same as the processing of S10 through S26 of FIG. 2, but the sequence of processing is different. As shown in FIG. 5, the situation in which the NFC connection is established between the IC tag I/F 22 of the printer 10 and the NFC I/F of the portable terminal 50, and subsequently the read command is communicated by using this NFC connection, is the same as in the first embodiment.

When the read command is received from the portable terminal 50, the IC tag I/F 22 of the printer 10 supplies a particular notification to the controller 30. Due to this, the CPU 32 determines YES in S10 of FIG. 4, and transfers to S16. Thus, in this embodiment, when YES is determined in S10, the CPU 32 does not perform creation of the WFD WSI (S12) and supply of WFD WSI to the IC tag I/F 22 (S14). This is because the WFD WSI is supplied to the IC tag I/F 22 when the power to the printer 10 is turned on, or during the processing of S14 that will be described hereinafter, so that the WFD WSI is already stored in the RAM 24 of the IC tag I/F 22. Accordingly, when the read command is received from the portable terminal 50, the IC tag I/F 22 of the printer 10 does not obtain the WFD WSI from the controller 30, but sends the WFD WSI in the RAM 24 (in other words, the SSID "X1") to the portable terminal 50.

The processing of S16 through S26 of FIG. 4 is the same as the processing of S16 through S26 of FIG. 2. When the processing of S16 through S26 of FIG. 4 is performed, as shown in FIG. 5, a WFD network to which only the printer 10 belongs is formed, then the WFD network to which both the printer 10 and the portable terminal 50 belong is formed, then communication of print data is performed, and then the WFD network disappears.

As shown in FIG. 4, when S26 has been completed (in other words, when the WFD network disappears), the CPU 32 performs creation of WFD WSI (S12) and supplies the WFD WSI to the IC tag I/F 22 (S14). In S12, the CPU 32 creates an SSID and a password by generating random character strings. Accordingly the SSID and the password that are created in S12 will be different from the SSID and the password that were created when the power was turned on (and from those created when S12 was performed in the past). In FIG. 6, the concrete value of the SSID that is created in S12 is shown as being "X2". The IC tag I/F 22 deletes the WFD WSI in the RAM 24 (in other words, the WFD WSI that was created when the power was turned on), and stores the new WFD WSI (in other words, the WFD WSI provided in S14) in the RAM 24.

When S14 of FIG. 5 has been completed, the CPU 32 returns to S10. As shown in FIG. 6, when an NFC connection has been established for a second time between the printer 10 and the portable terminal 50, the IC tag I/F 22 sends the WFD WSI (in other words, the SSID "X2") in the RAM 24 to the portable terminal 50. The subsequent processing is the same as in FIG. 5, except for the feature that the SSID "X2" is used, instead of the SSID "X1".

(Advantageous Effects of the Second Embodiment)

This embodiment provides similar advantageous effects to those of the first embodiment. Moreover, since in this embodiment the IC tag I/F 22 is equipped with the RAM 24, it is possible to store the WFD WSI in advance in the RAM 24 before the NFC connection is established. Due to this, when the NFC connection is established, the IC tag I/F 22 is able to send the WFD WSI within the RAM 24 rapidly to the portable terminal 50, without even obtaining the WFD WSI from the controller 30.

(Correspondence Relationship)

In this embodiment, the WFD network of FIG. 5 and the WFD) network of FIG. 6 are respectively examples of "first wireless network" and "second wireless network". Moreover, the SSID "X2" is an example of "network identification information".

(Third Embodiment)

The features of difference of this third embodiment from the first embodiment will now be explained. In this embodiment, in a similar manner to the first embodiment, the IC tag I/F 22 does not include the RAM. In the first embodiment, the printer 10 selectively operates in any of two states: the G/O state and the device state. By contrast, in this embodiment, the printer 10 selectively operates in any of three states: the G/O state, the CL state, and the device state. For example, the printer 10 may perform a G/O negotiation with an apparatus other than the printer 10, and it may be determined that the printer 10 becomes a CL apparatus.

Figure 7:
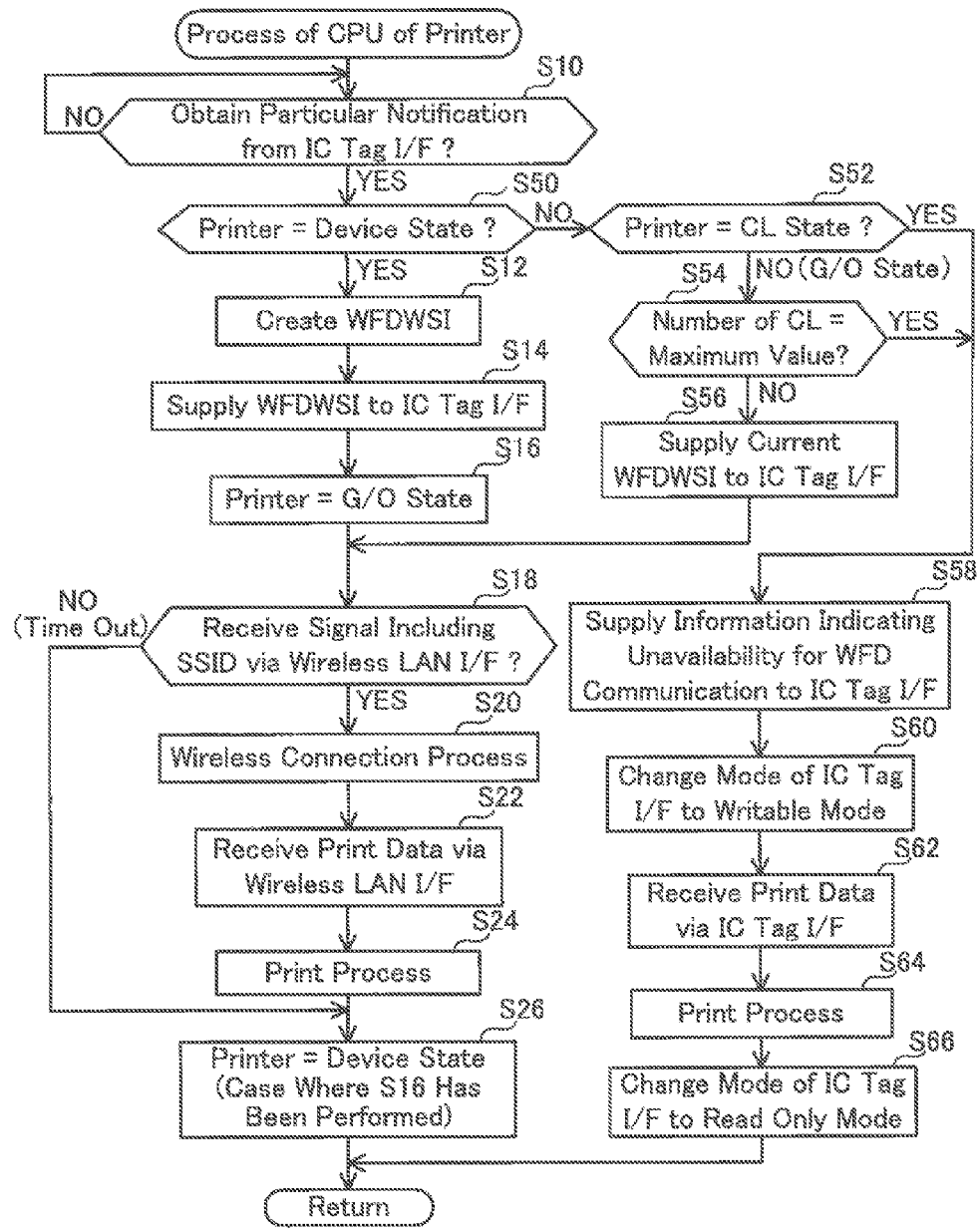
FIG. 7 shows a flow chart for processing performed by a CPU of a printer of a third embodiment.

(The Processing Performed by the CPU 32 of the Printer 10: FIGS. 7 and 8)

The details of the processing performed by the CPU 32 of the printer 10 of this embodiment will now be explained with reference to FIGS. 7 and 8. When an user desires a WFD network to be formed to which both the printer 10 and the PC 110 belong, the user performs a predetermined operation upon the operating panel 12 of the printer 10, and performs a predetermined operation upon the PC 110. Due to this, the CPU 32 of the printer 10 performs a G/O negotiation with the PC 110 via the wireless LAN I/F 20.

In the G/O negotiation, the CPU 32 sends information specifying a G/O priority level of the printer 10 (that is, Intent value) to the PC 110, and receives information specifying a G/O priority level of the PC 110 from the PC 110. The G/O priority level of the printer 10 is an index that specifies the level at which the printer 10 should operate in the G/O state, and is determined by the printer 10 in advance. In a similar manner, the G/O priority level of the PC 110 is an index that specifies the level at which the PC 110 should operate in the G/O state, and is determined by the PC 110 in advance.

The CPU 32 compares the G/O priority level of the printer 10 and the G/O priority level of the PC 110, and determines that the apparatus whose priority level is the higher should operate in the G/O state, while determining that the apparatus whose priority level is the lower should operate in the CL state. In the case C of FIG. 8, it is determined that the printer 10 should operate in the G/O state, while it is determined that the PC 110 should operate in the CL state. In other words, the CPU 32 changes the WFD state value in the main memory 34 from a value that indicates the device state to a value that indicates the G/O state. Moreover, the CPU 32 creates a management list that includes the MAC address of the PC 110 within the main memory 34. Furthermore, in the case D, it is determined that the printer 10 should operate in the CL state, while it is determined that the PC 110 should operate in the G/O state. In other words, the CPU 32 changes the WFD state value in the main memory 34 from a value that indicates the device state to a value that indicates the CL state.

If the printer 10 becomes the G/O apparatus (in other words, in the case C), the printer 10 (in other words, the CPU 32) creates WFD WSI. Then the CPU 32 supplies the created WFD WSI to the PC 110 via the wireless LAN I/F 20. As a result, a WFD connection is established between the printer 10 and the PC 110, and a WFD network is formed to which the printer 10, which is the G/O apparatus, and the PC 110, which is the CL apparatus, both belong.

On the other hand, if the printer 10 becomes the CL apparatus (in other words, in the case D), the PC 110 creates WFD WSI. The CPU 32 receives the WFD WSI from the PC 110 via the wireless LAN I/F 20. As a result a WFD connection is established between the printer 10 and the PC 110, and a WFD network is formed to which the printer 10, which is the CL apparatus, and the PC 110, which is the G/O apparatus, both belong.

When the WFD network has been formed to which both the printer 10 and the PC 110 belong, as in the case C or D described above, then the printer 10 is able to receive print data from the PC 110 by using the WFD network, and is enabled to perform print processing.

While, in the first or the second embodiment, the NFC connection is established between the printer 10 and the portable terminal 50 while the state of the printer 10 is the device state, no NFC connection is established while the state of the printer is the G/O state or the CL state. By contrast, in this embodiment, since the WFD network to which both the printer 10 and the PC 110 belong can be formed, a NFC connection can also be established while the state of the printer is the G/O state or the CL state.

As shown in FIG. 8, the situation in which an NFC connection is established between the IC tag I/F 22 of the printer 10 and the NFC I/F of the portable terminal 50, and thereafter a read command is communicated by using this NFC connection, is the same as that in FIG. 5 for the first embodiment.

When the IC tag I/F 22 of the printer 10 receives the read command from the portable terminal 50, it supplies a particular notification to the controller 30. Due to this, the CPU 32 determines YES in S10 of FIG. 7, and transfers to S50.

In S50, the CPU 32 determines whether or not the current state of the printer 10 is the device state. If the WFD state value within the main memory 34 is a value that indicates the device state, the CPU 32 determines YES in S50, and transfers to S12. The processing of S12 through S26 is the same as the processing of S12 through S26 of FIG. 2.

On the other hand, if the WFD state value in the main memory 34 is a value that indicates the G/O state or the CL state, the CPU 32 determines NO in S50, and transfers to S52. In S52, the CPU 32 determines whether or not the current state of the printer 10 is the CL state. If the WFD state value in the main memory 34 is a value that indicates the CL state (in other words, in the case D of FIG. 8), the CPU 32 determines YES in S52, and transfers to S58. On the other hand, if the WFD state value in the main memory 34 is a value that indicates the G/O state (in other words, in the case C of FIG. 8), the CPU 32 determines NO in S52, and transfers to S54.

In S54, the CPU 32 determines whether or not the number of CL apparatuses belonging to the WFD network in which the printer 10 is the G/O apparatus is equal to a predetermined maximum value. More specifically, first, the CPU 32 reads out the number of MAC addresses that are written in the management list in the main memory 34, and specifies the number of CL apparatuses. Then, if the number of CL apparatuses is equal to the maximum value, the CPU 32 determines YES in S54, and transfers to S58. On the other hand, if the number of CL apparatuses is not equal to the maximum value, in other words if the number of CL apparatuses is less than the maximum value, the CPU 32 determines NO in S54, and transfers to S56.

In S56, the CPU 32 writes into the IC tag memory 36 the WFD WSI that is currently being used by the WFD network in which the printer 10 is the G/O apparatus (in other words, the WFD WSI that was created by the printer 10 after the G/O negotiation described above). The CPU 32 supplies the WFD WSI in the IC tag memory 36 to the IC tag I/F 22. As a result, the I/F 22 sends the WFD WSI to the portable terminal 50 by using the NFC connection.

When S56 has been completed, the CPU 32 transfers to S18. If a Probe Request signal has been received from the portable terminal 50 (YES in S18), then the CPU 32 causes the portable terminal 50 to participate to the WFD network to which the printer 10 and the PC 110 belong (S20), receives print data from the portable terminal 50 by using the WFD network (S22), and performs print processing (S24). It should be understood that, even when S24 has been completed, the CPU 32 does not make a transition from the G/O state to the device state (in other words, does not perform the processing of S26). This is because, supposing that the WFD network to which the printer 10 and the PC 110 belong were undesirably to disappear when the processing of S26 is performed, then it would become impossible for the printer 10 to receive the print data from the PC 110.

In this embodiment a security policy is employed in which, while the G/O apparatus has authority to cause other apparatus to participate to the WFD network, the CL apparatus does not have authority to cause other apparatus to participate to that WFD network. Accordingly, if YES is determined in S52, in other words if the NFC connection is established while the state of the printer 10 is the CL state, the printer 10 is not able to cause the portable terminal 50 to participate to the WFD network. Due to this, in S58, the CPU 32 does not supply the WFD WSI that is being used by the WFD network in which the printer 10 is the CL apparatus to the IC tag IF 22, but rather supplies information to the IC tag I/F 22 specifying that WFD communication cannot be performed (in the following, this is termed "unavailability information"). More specifically, in S58, the CPU 32 writes the unavailability information into the IC tag memory 36, and supplies the unavailability information in the IC tag memory 36 to the IC tag I/F 22. Due to this, the IC tag I/F 22 sends the unavailability information to the portable terminal 50 by using the NFC connection.

Moreover if YES is determined in S54, in other words if, although the NFC connection is established while the state of the printer is the G/O state, the number of CL apparatuses is equal to the maximum value, then it is not possible for the portable terminal 50 to participate to the WFD network, since the CPU 32 is not able to increase the number of CL apparatuses that are the subjects of management any further. In this case as well, in S58, the CPU 32 supplies the unavailability information to the IC tag I/F 22.

Next in S60 the CPU 32 supplies a mode change instruction to the IC tag I/F 22, and changes over the operation mode of the IC tag I/F 22 from the Read Only mode to the Writable mode.

If the portable terminal 50 (in other words the printing application) receives the unavailability information from the printer 10, it determines that it is necessary to send the print data to the printer 10 by using the NFC communication, rather than WFD communication. The portable terminal 50 determines that it should operate in the Writer mode of the R/W mode, and sends a write command according to the NFC standard and the print data to the printer 10 by using the NFC connection.

Since the IC tag I/F 22 of the printer 10 is operating in the Writable mode (refer to S60), when it receives the write command from the portable terminal 50, it performs the write response operation in response to the write command. That is, the IC tag I/F 22 supplies the print data to the controller 30. As a result, in S62, the CPU 32 receives the print data from the portable terminal 50 via the IC tag IF 22.

Next, the CPU 32 performs print processing in S64 (i.e. similar processing to S24). Next in S66 the CPU 32 supplies a mode change instruction to the IC tag I/F 22, and changes over the operation mode of the IC tag I/F 22 from the Writable mode to the Read Only mode. When S66 has been completed, the CPU 32 returns to S10.

(Advantageous Effects of the Third Embodiment)

In this embodiment, if the NFC connection is established while the printer 10 is in the device state (YES in S50 of FIG. 7), then, in a similar manner to the case with the first embodiment, the printer 10 sends the WFD WSI to the portable terminal 50 (S14), the WFD network is formed to which only the printer 10, which is the G/O apparatus, belongs (S16), and subsequently the WFD network to which both the printer 10 and the portable terminal 50 belong is formed (S20). Due to this, the printer 10 is able to receive the print data from the portable terminal 50 by using the WFD network (S22), so as to perform the print processing in an appropriate manner (S24).

If the NFC connection is established while the printer 10 is in the G/O state (NO in S52 of FIG. 7), then the printer 10 determines whether or not the number of CL apparatuses is equal to the maximum value (S54). If it is determined that the number of CL apparatuses is not equal to the maximum value (NO in S54), the printer 10 sends the WFD WSI to the portable terminal 50 (S56), and the WFD network is formed to which both the printer 10 and the portable terminal 50 belong (S20). Due to this, the printer 10 is able to receive the print data from the portable terminal 50 by using the WFD network (S22), so as to perform the print processing in an appropriate manner (S24).

On the other hand, if it is determined that the number of CL apparatuses is not equal to the maximum value (YES in S54), the printer 10 sends the unavailability information to the portable terminal 50 (S58), and is able to receive the print data from the portable terminal 50 by using the NFC connection (S62), so as to perform print processing in an appropriate manner (S64).

Moreover, if the NFC connection is established while the printer 10 is in the CL state (YES in S52 of FIG. 7), then the printer 10 sends the unavailability information to the portable terminal 50 (S58), and is able to receive the print data from the portable terminal 50 by using the NC connection (S62), so as to perform print processing in an appropriate manner (S64).

As described above, the printer 10 is able to perform appropriate processing according to the state of the printer 10, and is able to perform the print processing in an appropriate manner. In particular, it is necessary to receive the print data from the portable terminal 50 by using the NFC connection (YES in S52 or YES in S54), then, since the printer 10 changes the operation mode of the IC tag I/F 22 over to the Writable mode (S60), accordingly the printer 10 is able to receive the print data from the portable terminal 50 in an appropriate manner by using the NFC connection (S62).

It should be understood that, if the print data is received by using the NFC connection (S62), then a longer time period is required for communicating the print data, as compared to reception of the print data by using the WFD connection (S22). However since, for example, with a so-called label printer which is capable of printing upon a printing medium that is comparatively small such as a label on a laminated film or the like, the data size of the print data is comparatively small as compared to the case of a normal printer which is capable of printing upon a printing medium that is comparatively large such as paper stock of A4 size or the like, accordingly, even if the method of receiving the print data by using the NFC connection is employed, still it is possible to prevent the user from being caused to experience a feeling of dissatisfaction due to the time period for communicating the print data becoming long. In other words, while it is possible for the printer 10 to be a normal printer, it is more desirable for it to be a label printer.

(Correspondence Relationship)

The Read Only mode and the Writable mode are respectively examples of "first mode" and "second mode". The case YES in S50, the case NO in S52, and the case YES in the step 52 are respectively examples of "first case", "second case", and "third case". The CL state is an example of "child state".

(Variant Embodiment #1)

The "first communication apparatus" is not limited to the printer 10, and it could also be a scanner, a copier, a multi-function device, a portable terminal, a PC, a server, or the like. For example, in a variant embodiment in which a scanner is an example of "first communication apparatus", it would be possible to arrange for a CPU of the scanner to send scan data to the portable terminal via a wireless LAN I/F, using a WFD network to which both the scanner and the portable terminal belong. In this variant embodiment, the scan data is an example of "target data". Moreover, for example, in an embodiment in which a PC is an example of "first communication apparatus", it would be possible to arrange for a CPU of the PC to send a data file within the PC (for example a document file or the like) to the portable terminal via a wireless LAN I/F, using a WFD network to which both the PC and the portable terminal belong. In this variant embodiment, the data file is an example of "target data". Moreover, the "second communication apparatus" is not limited to the portable terminal 50, and it would also be possible for it to be a printer, a scanner, a copier, a multi-function device, a PC, a server, or the like.

(Variant Embodiment #2)

The "second type of interface" is not limited to the wireless LAN I/F 20 for performing the WFD communication, and for example, it could also be a wireless LAN I/F for performing a wireless communication via an access point (hereinafter termed an "AP"). In this variant embodiment it would be possible, if the printer 10 belongs to a specific wireless network formed by the AP, to arrange for the CPU 32 of the printer 10 to send an SSID of the specific wireless network to the portable terminal 50 by using a NFC connection. In this case, it could be arranged for the portable terminal 50 to send a Probe Request signal including the above SSID to the AP, so as to participate to the specific wireless network described above. In this case as well, the CPU 32 of the printer 10 may receive the print data from the portable terminal 50 by using the specific wireless network to which both the printer 10 and the portable terminal 50 belong (in other words, via the AP).

(Variant Embodiment #3)

The "second type of interface" is not limited to the wireless LAN I/F 20, and for example, it could also be a BT I/F for performing a wireless communication according to Blue-Tooth (registered trademark). In this variant embodiment, a passkey (in other words, a PIN) that is used by the Bluetooth (registered trademark) wireless network is an example of the "network identification information". It should be understood that, if it is contemplated to increase the communication speed of NFC communication, then the communication speed of wireless communication via a BT I/F may be slower than the communication speed of wireless communication via the NFC I/F 22. To speak in general terms, the communication speed of wireless communication via the second type of interface may be faster than the communication speed of wireless communication via the first the first type of interface, or may be slower.

(Variant Embodiment #4)

In FIG. 2, it would also be possible to arrange for the CPU 32 of the printer 10 to perform the processing of S16, and to perform the processing of S14 subsequently. To speak generally, it would be acceptable, as in the embodiments described above, to arrange for the CPU 32 to transit the state of the printer 10 from the device state to the G/O state by the processing of S14, after having created the SSID by the processing of S12; and it would also be acceptable, as in this variant embodiment, to create the SSID by the processing of S12, after having transited the state of the printer 10 from the device state to the G/O state by the processing of S14.

(Variant Embodiment #5)

In S16 of FIG. 2, the CPU 32 of the printer 10 forms the wireless network by transiting the state of the printer 10 from the device state to the G/O state of the WFD standard. Instead of this, the CPU 32 may form a wireless network by activating so-called Soft AP in order to cause the printer 10 to operate as an AP. In this variant embodiment, the CPU 32 creates wireless setting information (a SSID, a BSSID, and so on) to be used by the wireless network in S12, and supplies the wireless setting information to the IC tag I/F 22 in S14. In this variant embodiment as well, S18 through S24 are performed in a similar manner. In S26, the CPU 32 stops the Soft AP. In this variant embodiment, the state in which the Soft AP has been activated is an example of "parent state".

(Variant Embodiment #6)

In the embodiments described above, the processing of FIG. 2, FIG. 4, or FIG. 7 is implemented by the CPU 32 of the printer 10 executing a program (i.e. software) within the main memory 34. Instead of this, it would also be possible for the processing of at least one of FIG. 2, FIG. 4, or FIG. 7 to be implemented by hardware such as logic circuitry or the like.

The invention claimed is:

1. A first communication apparatus comprising:
   a first type of interface configured to function as an integrated circuit tag (IC tag);
   a second type of interface; and
   a controller comprising:
      a processor; and
      memory storing computer-readable instructions therein, the computer-readable instructions, when executed by the processor, causing the first communication apparatus to perform:
         causing the first type of interface to execute a sending operation, the sending operation being executed by using a first wireless connection established between the first communication apparatus and a second communication apparatus, the sending operation including an operation in which the first type of interface sends network identification information to the second communication apparatus, the network identification information being information to be used in a first wireless network to which both of the first communication apparatus and the second communication apparatus belong;
         transitioning a state of the first communication apparatus from a non-belonging state to a parent state so as to form the first wireless network to which only the first communication apparatus belongs, in a case where the first wireless connection is established while the state of the first communication apparatus is the non-belonging state, the parent state being a state in which the first communication apparatus functions as a parent station of a wireless network, the non-belonging state being a state in which the first communication apparatus does not belong to a wireless network;

establishing a second wireless connection between the first communication apparatus and the second communication apparatus via the second type of interface so as to form the first wireless network to which both of the first communication apparatus and the second communication apparatus belong, in a case where a specific signal including the network identification information is received from the second communication apparatus via the second type of interface, after the first wireless network to which only the first communication apparatus belongs has been formed; and executing, after the first type of interface has executed the sending operation, a wireless communication of target data with the second communication apparatus via the second type of interface by using the first wireless network to which the both the first communication apparatus and the second communication apparatus belong.

2. A first communication apparatus comprising:

a first type of interface configured to function as an integrated circuit tag (IC tag);

a second type of interface; and a controller comprising:

a processor; and a memory storing computer-readable instructions therein, the computer-readable instructions, when executed by the processor, causing the first communication apparatus to perform:

causing the first type of interface to execute a sending operation, the sending operation being executed by using a first wireless connection established between the first communication apparatus and a second communication apparatus, the sending operation including an operation in which the first type of interface to send network identification information to the second communication apparatus, the network identification information being information to be used in a first wireless network to which both of the first communication apparatus and the second communication apparatus belong; and executing, after the first type of interface has executed the sending operation, a wireless communication of target data with the second communication apparatus via the second type of interface by using the first wireless network to which both of the first communication apparatus and the second communication apparatus belong, wherein causing the first type of interface to execute the sending operation includes controlling an operation mode of the first type of interface such that the first wireless connection is established in a state where the operation mode of the first type of interface is a first mode, and wherein the first mode is:

a mode in which the first type of interface sends information to an exterior of the first communication apparatus in response to a read command, if the read command is received from a source external to the first communication apparatus; and a mode in which the first type of interface does not execute an operation in accordance with a write command, even if the write command is received from a source external to the first communication apparatus.

3. A first communication apparatus comprising:

a first type of interface configured to function as an integrated circuit tag (IC tag) of a Near Field Communication standard (NFC standard);

a second type of interface configured to execute a wireless communication in accordance with a specific standard which is different from the NFC standard; and a controller comprising:

a processor; and a memory storing computer-readable instructions therein, the computer-readable instructions, when executed by the processor, causing the first communication apparatus to perform:

causing the first type of interface to execute a sending operation, the sending operation being executed by using a first wireless connection of the NFC standard established between the first communication apparatus and a second communication apparatus, the sending operation including an operation in which the first type of interface to send network identification information to the second communication apparatus, the network identification information being information to be used in a first wireless network to which both of the first communication apparatus and the second communication apparatus belong; and executing, after the first type of interface has executed the sending operation, a wireless communication of target data with the second communication apparatus via the second type of interface by using the first wireless network to which both of the first communication apparatus and the second communication apparatus belong, wherein:

causing the first type of interface to execute the sending operation includes causing the first type of interface to execute the sending operation in a case where the first wireless connection is established, regardless of whether the second communication apparatus comprises an application to execute the wireless communication of the target data in accordance with the specific standard, the executing includes executing the wireless communication of the target data with the second communication apparatus in a case where the second communication apparatus comprises the application, and the computer-readable instructions, when executed, do not cause the first communication apparatus to perform the executing of the wireless communication of the target data with the second communication apparatus in a case where the second communication apparatus does not comprise the application.

4. A first communication apparatus comprising:

a controller;

a first type of interface configured to function as an integrated circuit tag (IC tag), the first type of interface being communicatively connected with the controller, the first type of interface executing a sending operation by using a first wireless connection established between the first communication apparatus and a second communication apparatus, the sending operation including an operation in which the first type of interface sends network identification information to the second communication apparatus, the network identification information being information to be used in a first wireless network to which both of the first communication apparatus and the second communication apparatus belong; and a second type of interface, wherein the controller comprises:

a processor; and a memory storing computer-readable instructions therein, the computer-readable instructions, when executed by the processor, causing the first communication apparatus to perform:

transitioning a state of the first communication apparatus from a non-belonging state to a parent state so as to form the first wireless network to which only the first communication apparatus belongs, in a first case where the first wireless connection is established while the state of the first communication apparatus is the non-belonging state, the parent state being a state in which the first communication apparatus functions as a parent station of a wireless network, the non-belonging state being a state in which the first communication apparatus does not belong to a wireless network;

establishing a second wireless connection between the first communication apparatus and the second communication apparatus via the second type of interface so as to form the first wireless network to which the both the first communication apparatus and the second communication apparatus belong, in a case where a specific signal including the network identification information is received from the second communication apparatus via the second type of interface, after the first wireless network to which only the first communication apparatus belongs has been formed; and executing, after the first type of interface has executed the sending operation, a wireless communication of target data with the second communication apparatus via the second type of interface by using the first wireless network to which both of the first communication apparatus and the second communication apparatus belong.

5. The first communication apparatus as in claim 4, wherein:

the first type of interface is further configured to supply a particular notification to the controller in a case where the first wireless connection is established, and the computer-readable instructions, when executed, further cause the first communication apparatus to perform:

when the particular notification is received from the first type of interface in the first case, creating the network identification information so as to supply the network identification information to the first type of interface.

6. The first communication apparatus as in claim 5, wherein the state of the first communication apparatus is transitioned from the non-belonging state to the parent state after the network identification information has been created in the first case.

7. The first communication apparatus as in claim 4, wherein the computer-readable instructions, when executed, further cause the first communication apparatus to perform:

when a second wireless network in which the first communication apparatus functions as the parent station disappears, creating the network identification information to be used in the first wireless network which is to be formed after the second wireless network, so as to supply the network identification information to the first type of interface.

8. The first communication apparatus as in claim 4, wherein:

the first type of interface is further configured to supply a particular notification to the controller in a case where the first wireless connection is established, and when the particular notification is received from the first type of interface in the first case, the state of the first communication apparatus is transitioned from the non-belonging state to the parent state.

9. The first communication apparatus as in claim 4, wherein:

the first type of interface is further configured to supply a particular notification to the controller in a case where the first wireless connection is established, and the computer-readable instructions, when executed, further cause the first communication apparatus to perform:

when the particular notification is received from the first type of interface, supplying the network identification information to the first type of interface.

10. The first communication apparatus as in claim 4, wherein:

the computer-readable instructions further cause the first communication apparatus to perform:

controlling an operation mode of the first type of interface such that the first wireless connection is established in a state where the operation mode of the first type of interface is a first mode, and the first mode is:

a mode in which the first type of interface sends information to an exterior of the first communication apparatus in response to a read command, if the read command is received from an exterior of the first communication apparatus; and a mode in which the first type of interface does not execute an operation in accordance with a write command, even if the write command is received from an exterior of the first communication apparatus.

11. The first communication apparatus as in claim 4, wherein:

the first type of interface is further configured to function as the IC tag of a Near Field Communication standard (NFC standard), and the sending operation is executed by using the first wireless connection of the NFC standard.

12. The first communication apparatus as in claim 11, wherein:

the second type of interface is an interface to execute a wireless communication in accordance with a specific standard which is different from the NFC standard, the sending operation is executed in a case where the first wireless connection is established, regardless of whether the second communication apparatus comprises an application to execute the wireless communication of the target data in accordance with the specific standard, the wireless communication of the target data with the second communication apparatus is executed in a case where the second communication apparatus comprises the application, and the wireless communication of the target data with the second communication apparatus is not executed in a case where the second communication apparatus does not comprise the application.

13. The first communication apparatus as in claim 4, wherein:
the computer-readable instructions, when executed, further cause the first communication apparatus to perform:
determining whether a number of child station apparatuses is identical to a predetermined maximum value, in a second case where the first wireless network in which the first communication apparatus functions as the parent station exists and the first wireless connection is established while the state of the first communication apparatus is the parent state, the child station apparatus being an apparatus which belongs to the first wireless network by operating in a child state,
if it is determined that the number of child station apparatuses is not identical to the predetermined maximum value in the second case:
the first type of interface executes the sending operation; and
the wireless communication of the target data with the second communication apparatus is executed via the second type of interface by using the first wireless network, and
if it is determined that the number of child station apparatuses is identical to the predetermined maximum value in the second case:
the first type of interface does not execute the sending operation; and
the computer-readable instructions, when executed, further cause the first communication apparatus to perform executing the wireless communication of the target data with the second communication apparatus via the first type of interface by using the first wireless connection.

14. The first communication apparatus as in claim 13, wherein:
the computer-readable instructions further cause the first communication apparatus to perform:
controlling an operation mode of the first type of interface such that the first wireless connection is established in a state where the operation mode of the first type of interface is a first mode,
wherein the first mode is:
a mode in which the first type of interface sends information to a source external to the first communication apparatus in response to a read command, if the read command is received from a source external to the first communication apparatus; and
a mode in which the first type of interface does not execute an operation in accordance with a write command, even if the write command is received from a source external to the first communication apparatus; and
changing the operation mode of the first type of interface from the first mode to a second mode, in a case where the first type of interface does not execute the sending operation,
wherein the second mode is a mode in which the first type of interface receives information from an exterior of the first communication apparatus so as to supply the information to the controller in response to the write command, if the write command is received from a source external to the first communication apparatus, and
wherein the executing includes receiving the target data is received from the second communication apparatus via the first type of interface by using the first wireless connection in a state where the operation mode of the first type of interface is the second mode.

15. The first communication apparatus as in claim 4, wherein:
in a third case where the first wireless connection is established while the state of the first communication apparatus is a child state in which the first communication apparatus functions as a child station of a wireless network:
the first type of interface does not execute the sending operation; and
the computer-readable instructions, when executed, further cause the first communication apparatus to perform executing the wireless communication of the target data with the second communication apparatus via the first type of interface by using the first wireless connection.

16. The first communication apparatus as in claim 4, wherein a communication speed of a wireless communication via the second type of interface is faster than a communication speed of a wireless communication via the first type of interface.

17. The first communication apparatus as in claim 4, wherein:
the executing includes receiving the target data from the second communication apparatus via the second type of interface by using the first wireless network, and
the first communication apparatus further comprises:
a print mechanism configured to execute a print of an image represented by the received target data.

18. The first communication apparatus as in claim 4, wherein the parent state is a Group Owner State of a Wi-Fi Direct standard.

19. The first communication apparatus as in claim 4, wherein the parent state is a Soft AP.

20. The first communication apparatus as in claim 4, wherein the computer-readable instructions, when executed, further cause the first communication apparatus to perform:
transitioning the state of the first communication apparatus from the parent state to the non-belonging state after executing the wireless communication of the target data with the second communication apparatus.

21. The first communication apparatus as in claim 4, wherein the second type of interface is configured to execute a wireless communication according to a standard conforming to at least one standard among IEEE 802.11 standard and standards conforming to IEEE 802.11.

22. The first communication apparatus as in claim 4, wherein the computer-readable instructions, when executed, further cause the first communication apparatus to perform:
creating the network identification information when the first communication apparatus is turned on.

23. The first communication apparatus as in claim 4, wherein the computer-readable instructions, when executed, further cause the first communication apparatus to perform:
causing the first wireless network to disappear after executing the wireless communication of the target data with the second communication apparatus.

24. The first communication apparatus as in claim 4, wherein the computer-readable instructions, when executed, further cause the first communication apparatus to perform:
creating the network identification information which is different from network identification information which had been created by the first communication apparatus.

25. The first communication apparatus as in claim 4, wherein the first type of interface comprises a memory that stores the network identification information.

26. The first communication apparatus as in claim 4, wherein the controller is configured to supply the network identification information to the first type of interface.

27. A first communication apparatus comprising:
a controller;
a first type of interface configured to function as an integrated circuit tag (IC tag), the first type of interface being communicatively connected with the controller, the first type of interface executing a sending operation by using a first wireless connection established between the first communication apparatus and a second communication apparatus, the sending operation including an operation in which the first type of interface sends network identification information to the second communication apparatus, the network identification information being information to be used in a first wireless network to which both of the first communication apparatus and the second communication apparatus belong; and
a second type of interface,
the controller comprising:
a processor; and
memory storing computer-readable instructions therein, the computer-readable instructions, when executed by the processor, causing the first communication apparatus to perform:
controlling an operation mode of the first type of interface such that the first wireless connection is established in a state where the operation mode of the first type of interface is a first mode,
wherein the first mode is:
a mode in which the first type of interface sends information to an exterior of the first communication apparatus in response to a read command, if the read command is received from a source external to the first communication apparatus; and
a mode in which the first type of interface does not execute an operation in accordance with a write command, even if the write command is received from a source external to the first communication apparatus; and
executing, after the first type of interface has executed the sending operation, a wireless communication of target data with the second communication apparatus via the second type of interface by using the first wireless network to which the both the first communication apparatus and the second communication apparatus belong.

28. The first communication apparatus as in claim 27, wherein the computer-readable instructions, when executed, further cause the first communication apparatus to perform:
establishing a second wireless connection between the first communication apparatus and the second communication apparatus via the second type of interface so as to form the first wireless network to which the both the first communication apparatus and the second communication apparatus belong, in a case where a specific signal including the network identification information is received from the second communication apparatus via the second type of interface.

29. The first communication apparatus as in claim 27, wherein:
the first type of interface is further configured to supply a particular notification to the controller in a case where the first wireless connection is established, and
the computer-readable instructions, when executed, further cause the first communication apparatus to perform:
when the particular notification is received from the first type of interface, supplying the network identification information to the first type of interface.

30. The first communication apparatus as in claim 27, wherein:
the first type of interface is further configured to function as the IC tag of a Near Field Communication standard (NFC standard), and
the sending operation is executed by using the first wireless connection of the NFC standard.

31. The first communication apparatus as in claim 30, wherein:
the second type of interface is an interface to execute a wireless communication in accordance with a specific standard which is different from the NFC standard,
the sending operation is executed in a case where the first wireless connection is established, regardless of whether the second communication apparatus comprises an application to execute the wireless communication of the target data in accordance with the specific standard,
the wireless communication of the target data with the second communication apparatus is executed in a case where the second communication apparatus comprises the application, and
the wireless communication of the target data with the second communication apparatus is not executed in a case where the second communication apparatus does not comprise the application.

32. The first communication apparatus as in claim 27, wherein a communication speed of a wireless communication via the second type of interface is faster than a communication speed of a wireless communication via the first type of interface.

33. The first communication apparatus as in claim 27, wherein:
the executing includes receiving the target data from the second communication apparatus via the second type of interface by using the first wireless network, and
the first communication apparatus further comprises:
a print mechanism configured to execute a print of an image represented by the received target data.

34. The first communication apparatus as in claim 27, wherein the second type of interface is configured to execute a wireless communication according to at least one standard among IEEE 802.11 standard and standards conforming to IEEE 802.11.

35. The first communication apparatus as in claim 27, wherein the computer-readable instructions, when executed, further cause the first communication apparatus to perform:
creating the network identification information when the first communication apparatus is turned on.

36. The first communication apparatus as in claim 27, wherein the computer-readable instructions, when executed, further cause the first communication apparatus to perform:
causing the first wireless network to disappear after executing the wireless communication of the target data with the second communication apparatus.

37. The first communication apparatus as in claim 27, wherein the computer-readable instructions, when executed, further cause the first communication apparatus to perform:
creating the network identification information which is different from network identification information which had been created by the first communication apparatus.

38. The first communication apparatus as in claim 27, wherein the first type of interface comprises a memory that stores the network identification information.

39. The first communication apparatus as in claim 27, wherein the controller is configured to supply the network identification information to the first type of interface.

40. A first communication apparatus comprising:
a controller;
a first type of interface configured to function as an integrated circuit tag (IC tag) of a Near Field Communication standard (NFC standard), the first type of interface being communicatively connected with the controller, the first type of interface executing a sending operation by using a first wireless connection established between the first communication apparatus and a second communication apparatus, the sending operation being executed in a case where the first wireless connection is established, regardless of whether the second communication apparatus comprises an application, the application being for executing a wireless communication of target data in accordance with a specific standard which is different from the NFC standard, the sending operation including an operation in which the first type of interface sends network identification information to the second communication apparatus, the network identification information being information to be used in a first wireless network to which both of the first communication apparatus and the second communication apparatus belong; and
a second type of interface configured to execute a wireless communication in accordance with the specific standard,
wherein the controller comprises:
a processor; and
a memory storing computer-readable instructions therein, the computer-readable instructions, when executed by the processor, causing the first communication apparatus to perform:
in a case where the second communication apparatus comprises the application, executing, after the first type of interface has executed the sending operation, the wireless communication of the target data with the second communication apparatus via the second type of interface by using the first wireless network to which both of the first communication apparatus and the second communication apparatus belong,
wherein the wireless communication of the target data with the second communication apparatus is not executed in a case where the second communication apparatus does not comprise the application.

41. The first communication apparatus as in claim 40, wherein the computer-readable instructions, when executed, further cause the first communication apparatus to perform:
establishing a second wireless connection between the first communication apparatus and the second communication apparatus via the second type of interface so as to form the first wireless network to which both of the first communication apparatus and the second communication apparatus belong, in a case where a specific signal including the network identification information is received from the second communication apparatus via the second type of interface.

42. The first communication apparatus as in claim 40, wherein:
the first type of interface is further configured to supply a particular notification to the controller in a case where the first wireless connection is established, and
the computer-readable instructions, when executed, further cause the first communication apparatus to perform:
when the particular notification is received from the first type of interface, supplying the network identification information to the first type of interface.

43. The first communication apparatus as in claim 40, wherein a communication speed of a wireless communication via the second type of interface is faster than a communication speed of a wireless communication via the first type of interface.

44. The first communication apparatus as in claim 40, wherein:
the executing includes receiving the target data from the second communication apparatus via the second type of interface by using the first wireless network, and
the first communication apparatus further comprises:
a print mechanism configured to execute a print of an image represented by the received target data.

45. The first communication apparatus as in claim 40, wherein the computer-readable instructions, when executed, further cause the first communication apparatus to perform:
forming the first wireless network to which both of the first communication apparatus and the second communication apparatus belong, in the case where the second communication apparatus comprises the application, and
wherein the first wireless network is not formed in the case where the second communication apparatus does not comprise the application.

46. The first communication apparatus as in claim 40, wherein the second type of interface is configured to execute a wireless communication according to at least one standard among IEEE 802.11 standard and standards conforming to IEEE 802.11.

47. The first communication apparatus as in claim 40, wherein the computer-readable instructions, when executed, further cause the first communication apparatus to perform:
creating the network identification information when the first communication apparatus is turned on.

48. The first communication apparatus as in claim 40, wherein the computer-readable instructions, when executed, further cause the first communication apparatus to perform:
causing the first wireless network to disappear after executing the wireless communication of the target data with the second communication apparatus.

49. The first communication apparatus as in claim 40, wherein the computer-readable instructions, when executed, further cause the first communication apparatus to perform:
creating the network identification information which is different from network identification information which had been created by the first communication apparatus.

50. The first communication apparatus as in claim 40, wherein the first type of interface comprises a memory that stores the network identification information.

51. The first communication apparatus as in claim 40, wherein the controller is configured to supply the network identification information to the first type of interface.

* * * * *